US012387688B2

(12) United States Patent
Park et al.

(10) Patent No.: US 12,387,688 B2
(45) Date of Patent: Aug. 12, 2025

(54) GATE DRIVING CIRCUIT

(71) Applicant: Samsung Display Co., Ltd., Yongin-si (KR)

(72) Inventors: Junhyun Park, Yongin-si (KR); Hyeongseok Kim, Yongin-si (KR); Heejean Park, Yongin-si (KR); Sunhwa Lee, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/609,591

(22) Filed: Mar. 19, 2024

(65) Prior Publication Data

US 2024/0321216 A1 Sep. 26, 2024

(30) Foreign Application Priority Data

Mar. 24, 2023 (KR) ........................ 10-2023-0039093
May 23, 2023 (KR) ........................ 10-2023-0066478

(51) Int. Cl.
*G09G 3/3266* (2016.01)

(52) U.S. Cl.
CPC ... *G09G 3/3266* (2013.01); *G09G 2300/0819* (2013.01); *G09G 2310/08* (2013.01)

(58) Field of Classification Search
None
See application file for complete search history.

(56) References Cited

U.S. PATENT DOCUMENTS 8,937,489 B2 1/2015 Park et al.
9,947,274 B2 4/2018 Park et al.
10,593,282 B2 3/2020 Kim
11,545,080 B2 1/2023 Yu
2013/0328495 A1* 12/2013 Woo ........................ H05B 47/10 315/224
2016/0180800 A1* 6/2016 Zheng .................... G09G 5/003 377/64
2019/0206311 A1* 7/2019 Yu ............................ G09G 3/20
2021/0383760 A1* 12/2021 In .......................... G09G 3/3266
2022/0392400 A1* 12/2022 In ............................ G09G 3/32
2023/0252933 A1* 8/2023 Guo ...................... G09G 3/3266 345/55

FOREIGN PATENT DOCUMENTS

KR 10-2012-0091881 A 8/2012
KR 10-2017-0081801 A 7/2017
KR 10-2017-0116298 A 10/2017
KR 10-2020-0013923 A 2/2020

* cited by examiner

*Primary Examiner* — Sepehr Azari
(74) *Attorney, Agent, or Firm* — Womble Bond Dickinson (US) LLP

(57) ABSTRACT

A gate driving circuit is provided. Each stage of the gate driving circuit includes a first node controller configured to control a voltage level of a first node connected to a gate of a pull-down transistor, and a second node controller configured to control a voltage level of a second node connected to a gate of a pull-up transistor, wherein the first node controller comprises a first circuit and a second circuit, wherein the first circuit is connected between the first node and an input terminal to which a start signal is input, and configured to transfer the start signal to the first node, and the second circuit is connected between the input terminal and the first node, and may be configured to boost a voltage level of a voltage of the first node.

20 Claims, 16 Drawing Sheets

GATE DRIVING CIRCUIT

CROSS-REFERENCE TO RELATED APPLICATIONS

The present application claims priority to and the benefit of Korean Patent Application No. 10-2023-0039093, filed on Mar. 24, 2023, and Korean Patent Application No. 10-2023-0066478, filed on May 23, 2023, in the Korean Intellectual Property Office, the contents of which in their entirety are herein incorporated by reference.

BACKGROUND

1. Field

One or more embodiments relate to a gate driving circuit configured to output gate signals and a display apparatus including the gate driving circuit.

2. Description of Related Art

A display apparatus includes a pixel portion, a gate driving circuit, a data driving circuit, a controller, and the like, the pixel portion including a plurality of pixels. The gate driving circuit includes stages connected to gate lines, and the stages are configured to supply gate signals to the gate lines connected to the stages in response to signals received from the controller.

SUMMARY

One or more embodiments include a gate driving circuit configured to stably output gate signals and a display apparatus including the gate driving circuit. Aspects achieved by any embodiment are not limited to the aspects mentioned above, and other aspects that are not mentioned will be clearly understood by those of ordinary skill in the art from the description of the disclosure.

Additional aspects will be set forth in part in the description which follows and, in part, will be apparent from the description, or may be learned by practice of the presented embodiments of the disclosure.

According to one or more embodiments, a gate driving circuit includes stages, the stages including an output unit including a pull-up transistor and a pull-down transistor, the pull-up transistor being connected between a first voltage input terminal to which a first voltage is input and an output terminal, and the pull-down transistor being connected between the output terminal and a second voltage input terminal to which a second voltage is input, a first node controller configured to control a voltage level of a first node connected to a gate of the pull-down transistor, and including a first transistor connected between the first node and an input terminal to which a start signal is input, and a second transistor connected in parallel to the first transistor, and configured to compensate for a voltage loss of the start signal due to a threshold voltage of the first transistor when the first transistor transfers the start signal to the first node, and a second node controller configured to control a voltage of a second node connected to a gate of the pull-up transistor.

The first transistor may include a P-type transistor including a silicon semiconductor, and the second transistor includes an N-type transistor including an oxide semiconductor.

The first transistor may include a gate connected to a clock terminal, and the second transistor includes a gate connected to the second node.

The first transistor may include a gate connected to a clock terminal, and the second transistor may include a first gate and a second gate connected to the second node.

The first transistor and the second transistor may include P-type transistors including a silicon semiconductor.

The first transistor may include a gate connected to a clock terminal, wherein the second transistor includes a first gate connected to the clock terminal, and a second gate connected to a node of a previous stage.

The first node controller may further include a third transistor connected between the first transistor and the first node and including a gate connected to a third voltage input terminal to which a third voltage is input, wherein a voltage level of the second voltage is less than a voltage level of the first voltage, and wherein a voltage level of the third voltage is less than a voltage level of the second voltage.

The first node controller may further include a third transistor connected between the first transistor and the first node and including a first gate connected to the second voltage input terminal, and a second gate connected to a node of a previous stage, wherein a voltage level of the second voltage is less than a voltage level of the first voltage.

The first node controller may further include a fourth transistor connected between the input terminal and a fourth node, a fifth transistor connected between the fourth transistor and the fourth node, a diode-connected sixth transistor between the fourth node and the first node, and a capacitor connected to the fourth node.

The fourth transistor may include a gate connected to the second node, wherein the fifth transistor includes a gate connected to a third voltage input terminal to which a third voltage is input, wherein the fourth transistor includes an N-type transistor including an oxide semiconductor, wherein the fifth transistor includes a P-type transistor including a silicon semiconductor, wherein a voltage level of the second voltage is less than a voltage level of the first voltage, and wherein a voltage level of the third voltage is less than a voltage level of the second voltage.

The fourth transistor may include a first gate and a second gate connected to the second node, wherein the fifth transistor includes a gate connected to a third voltage input terminal to which a third voltage is input, wherein the fourth transistor includes an N-type transistor including an oxide semiconductor, wherein the fifth transistor includes a P-type transistor including a silicon semiconductor, wherein a voltage level of the second voltage is less than a voltage level of the first voltage, and wherein a voltage level of the third voltage is less than a voltage level of the second voltage.

The fourth transistor may include a first gate connected to a clock terminal, and a second gate connected to a fourth node of a previous stage, wherein the fifth transistor includes a gate connected to a third voltage input terminal to which a third voltage is input, wherein the fourth transistor and the fifth transistor include P-type transistors including a silicon semiconductor, wherein a voltage level of the second voltage is less than a voltage level of the first voltage, and wherein a voltage level of the third voltage is less than a voltage level of the second voltage.

The fourth transistor may include a first gate connected to a clock terminal, and a second gate connected to a fourth node of a previous stage, wherein the fifth transistor includes a first gate connected to the second voltage input terminal, and a second gate connected to the fourth node of the previous stage, wherein the fourth transistor and the fifth transistor include P-type transistors including a silicon semiconductor, and wherein a voltage level of the second voltage is less than a voltage level of the first voltage.

The first node controller may further include an eighteenth transistor connected in parallel to the fourth transistor, wherein the fourth transistor includes a gate connected to a clock terminal, wherein the fifth transistor includes a first gate connected to the second voltage input terminal, and a second gate connected to a fourth node of a previous stage, wherein the eighteenth transistor includes a first gate connected to the clock terminal, and a second gate connected to the fourth node of the previous stage, wherein the fourth transistor, the fifth transistor, and the eighteenth transistor include P-type transistors including a silicon semiconductor, and wherein a voltage level of the second voltage is less than a voltage level of the first voltage.

According to one or more embodiments, a gate driving circuit includes stages, the stages including an output unit including a pull-up transistor and a pull-down transistor, the pull-up transistor being connected between a first voltage input terminal to which a first voltage is input and an output terminal, and the pull-down transistor being connected between the output terminal and a second voltage input terminal to which a second voltage is input, a first node controller configured to control a voltage level of a first node connected to a gate of the pull-down transistor, and including a first circuit connected between an input terminal to which a start signal is input and the first node, and configured to transfer the start signal to the first node, and a second circuit connected between the input terminal and the first node, configured to boost a voltage level of a voltage of the first node, and including a fourth transistor connected between the input terminal and a third node, a capacitor connected to the third node, and a sixth transistor connected between the third node and the first node, and a second node controller configured to control a voltage of a second node connected to a gate of the pull-up transistor.

The gate driving circuit may further include a fifth transistor connected between the fourth transistor and the third node, wherein the fourth transistor includes a gate connected to the second node, wherein the fifth transistor includes a gate connected to a third voltage input terminal to which a third voltage is input, wherein the fourth transistor includes an N-type transistor including an oxide semiconductor, wherein the fifth transistor includes a P-type transistor including a silicon semiconductor, wherein a voltage level of the second voltage is less than a voltage level of the first voltage, and wherein a voltage level of the third voltage is less than a voltage level of the second voltage.

The gate driving circuit may further include a fifth transistor connected between the fourth transistor and the third node, wherein the fourth transistor may include a first gate and a second gate connected to the second node, wherein the fifth transistor includes a gate connected to the third voltage input terminal to which the third voltage is input, wherein the fourth transistor includes an N-type transistor including an oxide semiconductor, wherein the fifth transistor includes a P-type transistor including a silicon semiconductor, wherein a voltage level of the second voltage is less than a voltage level of the first voltage, and wherein a voltage level of the third voltage is less than a voltage level of the second voltage.

The gate driving circuit may further include a fifth transistor connected between the fourth transistor and the third node, wherein the fourth transistor may include a first gate connected to a clock terminal, and a second gate is connected to the third node of the previous stage, wherein the fifth transistor includes a gate connected to the third voltage input terminal to which the third voltage is input, wherein the fourth transistor and the fifth transistor include P-type transistors including a silicon semiconductor, wherein a voltage level of the second voltage is less than a voltage level of the first voltage, and wherein a voltage level of the third voltage is less than a voltage level of the second voltage.

The gate driving circuit may further include a fifth transistor connected between the fourth transistor and the third node, wherein the fourth transistor may include a first gate connected to a clock terminal, and a second gate connected to the third node of the previous stage, wherein the fifth transistor includes a first gate connected to the second voltage input terminal, and a second gate connected to the third node of the previous stage, wherein the fourth transistor and the fifth transistor include P-type transistors including a silicon semiconductor, and wherein a voltage level of the second voltage is less than a voltage level of the first voltage.

The gate driving circuit may further include a fifth transistor connected between the fourth transistor and the third node, wherein the second circuit further may include an eighteenth transistor connected in parallel to the fourth transistor, wherein the fourth transistor includes a gate connected to a clock terminal, wherein the fifth transistor includes a first gate connected to the second voltage input terminal, and a second gate connected to the third node of the previous stage, wherein the eighteenth transistor includes a first gate connected to the clock terminal, and a second gate connected to the third node of the previous stage, wherein the fourth transistor, the fifth transistor, and the eighteenth transistor include P-type transistors including a silicon semiconductor, and wherein a voltage level of the second voltage is less than a voltage level of the first voltage.

BRIEF DESCRIPTION OF THE DRAWINGS

The above and other aspects of certain embodiments of the disclosure will be more apparent from the following description taken in conjunction with the accompanying drawings, in which.

DETAILED DESCRIPTION

Figure 1:
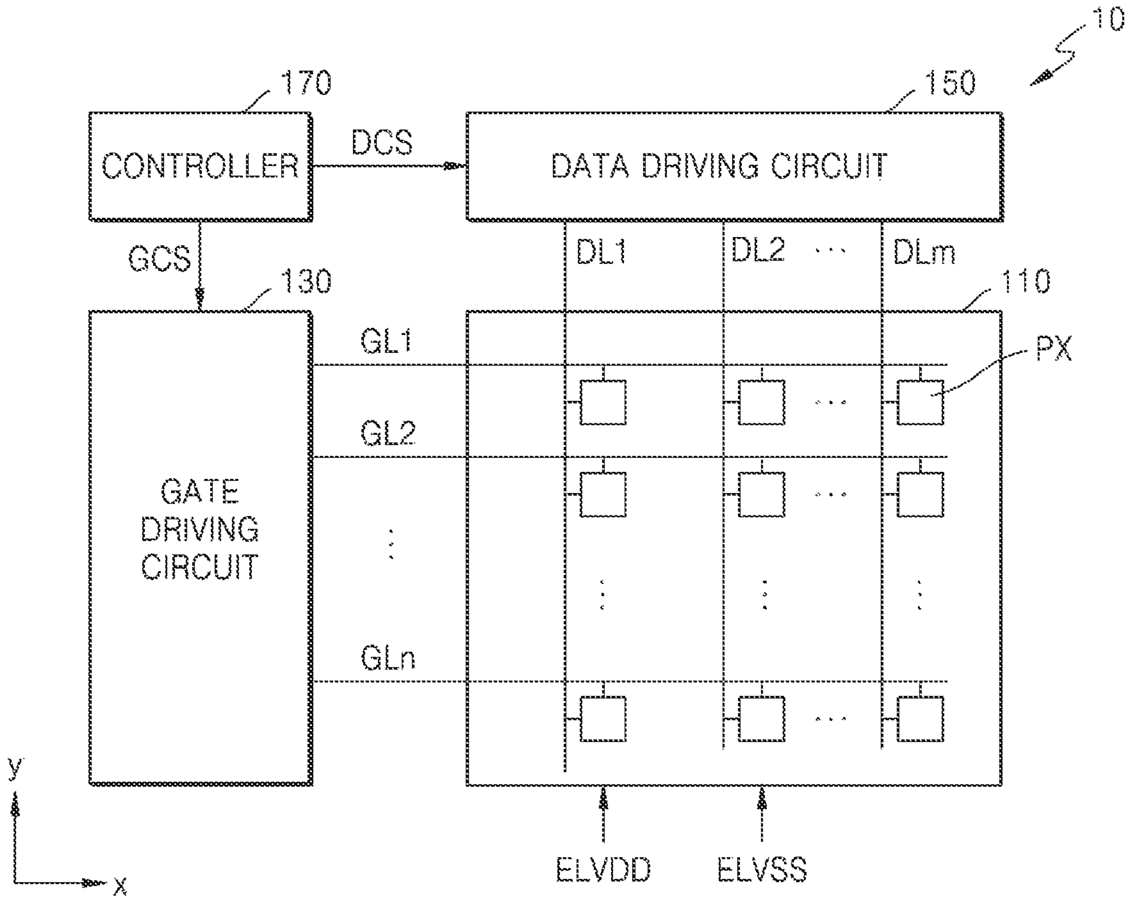
FIG. 1 is a schematic view of a display apparatus according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The present disclosure covers all modifications, equivalents, and replacements within the idea and technical scope of the present disclosure. Further, each of the features of the various embodiments of the present disclosure may be combined or combined with each other, in part or in whole, and technically various interlocking and driving are possible. Each embodiment may be implemented independently of each other or may be implemented together in an association.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, other expressions describing relationships between components, such as "between," "immediately between" or "adjacent to" and "directly adjacent to" may be construed similarly. It will be understood that when an element or layer is referred to as being "between" two elements or layers, it can be the only element or layer between the two elements or layers, or one or more intervening elements or layers may also be present.

For example, when it is described that X is connected to Y, directly or indirectly, X may be electrically connected to Y, X may be functionally connected to Y, or X may be physically connected to Y. Here, X and Y may be objects (e.g., apparatuses, elements, circuits, wirings, electrodes, terminals, conductive layers, layers, and the like). Accordingly, X and Y are not limited to preset connection relationships and connection relationships shown and made in the drawings and the detailed description, but may include connection relationships other than the connection relationships shown and made in the drawings and the detailed description.

The case where X is electrically connected to Y may include the case where X and Y are electrically connected directly and at least one element (e.g., a switch, a transistor, a capacitance element, an inductor, a resistance element, a diode, and the like) enabling electrical connection between X and Y is connected between X and Y.

In embodiments below, "ON" used in association with an element state may denote an active state of an element, and "OFF" may denote an inactive state of an element. "ON" used in association with a signal received by an element may denote a signal activating the element, and "OFF" may denote a signal inactivating the element. An element may be activated by a high-level voltage or a low-level voltage. As an example, a P-channel transistor (a P-type transistor) may be activated by a low-level voltage, and an N-channel transistor (an N-type transistor) may be activated by a high-level voltage. Accordingly, it should be understood that "ON" voltages for a P-type transistor and an N-type transistor are opposite (low vs. high) voltage levels. Hereinafter, a voltage that activates (turns on) a transistor is referred to as an on-voltage, and a voltage that inactivates (turns off) a transistor is referred to as an off-voltage. A period in which an on-voltage of a signal is maintained is referred to as an on-voltage period, and a period in which an off-voltage of a signal is maintained is referred to as an off-voltage period.

For the purposes of this disclosure, expressions, such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression, such as "at least one of A and B" and "at least one of A or B" may include A, B, or A and B. As used herein, "or" generally means "and/or," and the term "and/or" includes any and all combinations of one or more of the associated listed items. For example, the expression, such as "A and/or B" may include A, B, or A and B. Similarly, expressions, such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic view of a display apparatus 10 according to one or more embodiments.

The display apparatus 10 according to one or more embodiments may be an organic light-emitting display apparatus, an inorganic light-emitting display apparatus, or a quantum-dot light-emitting display apparatus.

Referring to FIG. 1, the display apparatus 10 according to one or more embodiments may include a pixel portion 110, a gate driving circuit 130, a data driving circuit 150, and a controller 170.

A plurality of pixels PX, and signal lines that may apply electrical signals to the plurality of pixels PX, may be arranged in the pixel portion 110.

The plurality of pixels PX may be repeatedly arranged in a first direction (e.g., an x direction, a row direction) and in a second direction (e.g., a y direction, a column direction). The plurality of pixels PX may be arranged in various configurations, such as a stripe configuration, a pentile configuration, a diamond configuration, a mosaic configuration, and the like, to display images. Each of the plurality of pixels PX may include an organic light-emitting diode as a display element. The organic light-emitting diode may be connected to a pixel circuit. The pixel circuit may include a plurality of transistors and at least one capacitor.

In one or more embodiments, the plurality of transistors included in the pixel portion 110 may be P-type silicon transistors. A silicon transistor may include a silicon semiconductor, and the silicon semiconductor may include amorphous silicon, polycrystalline silicon, and the like. As an example, the silicon transistor may be a low temperature polycrystalline silicon (LTPS) thin-film transistor.

In one or more other embodiments, the plurality of transistors included in the pixel circuit may be N-type oxide transistors. An oxide transistor may include an oxide semiconductor. As an example, the oxide transistor may be an oxide thin-film transistor. In one or more other embodiments, some of the plurality of transistors included in the pixel circuit may be P-type silicon transistors, and others may be N-type oxide transistors.

Signal lines configured to apply electrical signals to the plurality of pixels PX may include a plurality of gate lines GL1 to GLn and a plurality of data lines DL1 to DLm, wherein the plurality of gate lines GL1 to GLn extend in the first direction, and the plurality of data lines DL1 to DLm extend in the second direction. Herein, each of m and n is a natural number greater than 0. The plurality of gate lines GL1 to GLn may be apart from each other in the second direction, and may be configured to transfer gate signals to the pixels PX. The plurality of data lines DL1 to DLm may be apart from each other in the first direction, and may be configured to transfer data signals to the pixels PX. Each of the plurality of pixels PX may be connected to at least one corresponding gate line among the plurality of gate lines GL1 to GLn and to at least one corresponding data line among the plurality of data lines DL1 to DLm.

The gate driving circuit 130 may be connected to the plurality of gate lines GL1 to GLn, may be configured to generate gate signals according to gate driving control signals GCS from the controller 170, and may sequentially supply the gate signals to the gate lines GL1 to GLn. The gate lines GL1 to GLn may be connected to gates of the transistors included in the pixel PX, and a gate signal may be a gate control signal of controlling turn-on and turn-off of the transistor to which the gate line is connected. A gate signal may include a gate-on voltage by which a transistor may be turned on, and a gate-off voltage by which a transistor may be turned off.

Assuming that a period in which a gate-on voltage of a signal is maintained is an on-time, and a period in which a gate-off voltage of a signal is maintained is an off-time, an on-time and an off-time of a gate signal may be determined depending on the function of a transistor that receives a gate signal within the pixel PX. The gate driving circuit 130 may include a shift register configured to sequentially generate and output gate signals.

The data driving circuit 150 may be connected to the plurality of data lines DL1 to DLm, and may be configured to supply data signals to the data lines DL1 to DLm according to data driving control signals DCS from the controller 170. The data signals supplied to the data lines DL1 to DLm may be supplied to the pixels PX to which gate signals are supplied.

In the case where the display apparatus 10 is an organic light-emitting display apparatus, a first power voltage ELVDD and a second power voltage ELVSS may be supplied to the pixels PX of the pixel portion 110. The first power voltage ELVDD may be a high-level voltage provided to a first electrode (a pixel electrode or an anode) of an organic light-emitting diode included in each pixel PX. The second power voltage ELVSS may be a low-level voltage provided to a second electrode (an opposite electrode or a cathode) of an organic light-emitting diode. The first power voltage ELVDD and the second power voltage ELVSS are driving voltages configured to allow the plurality of pixels PX to emit light.

The controller 170 may be configured to generate a gate driving control signal GCS and a data driving control signal DCS based on signals input from the outside. The controller 170 may be configured to supply a gate driving control signal GCS to the gate driving circuit 130, and to supply a data driving control signal DCS to the data driving circuit 150.

Figure 2:
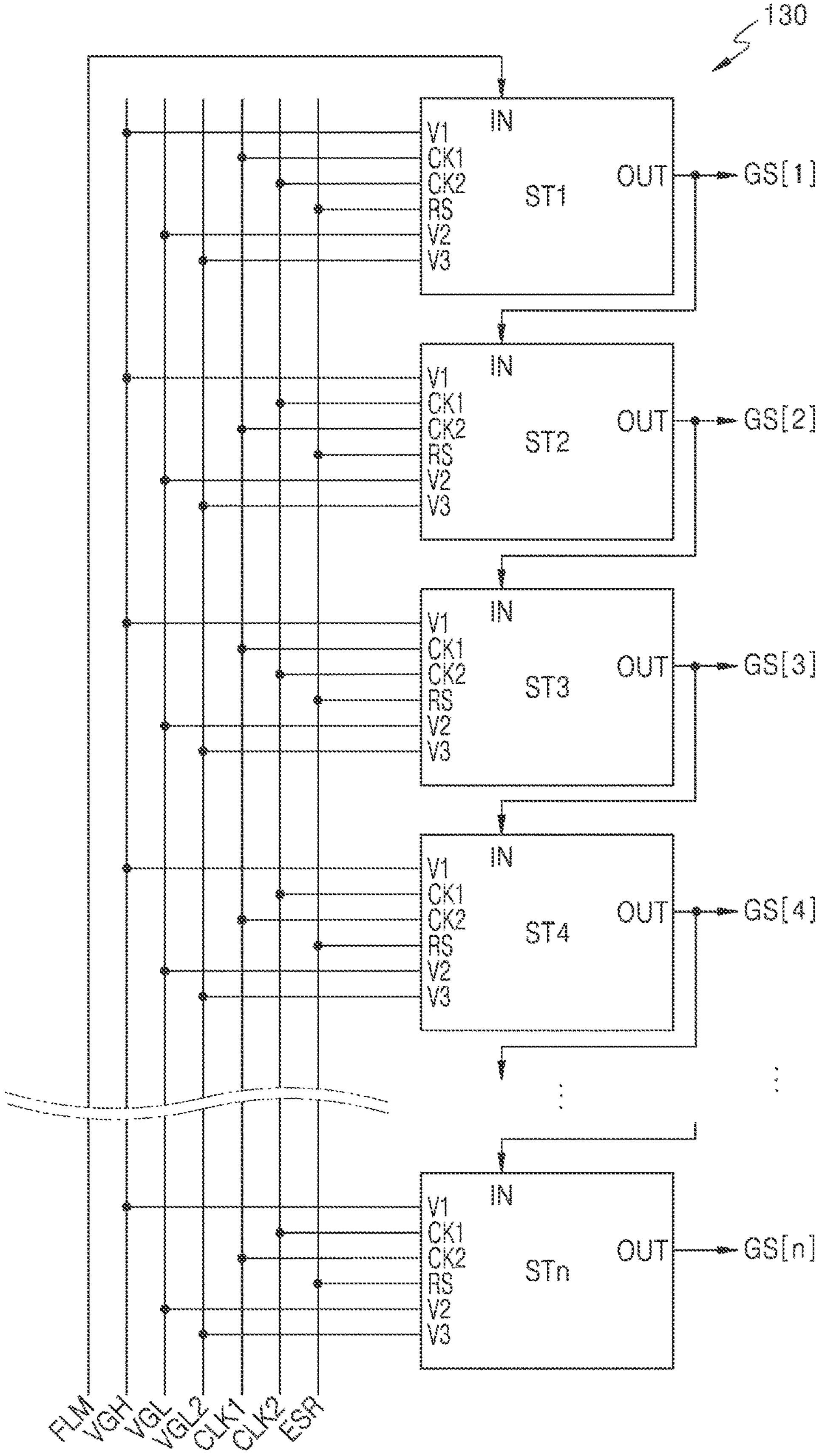
FIG. 2 is a schematic view of a gate driving circuit according to one or more embodiments.
Figure 3:
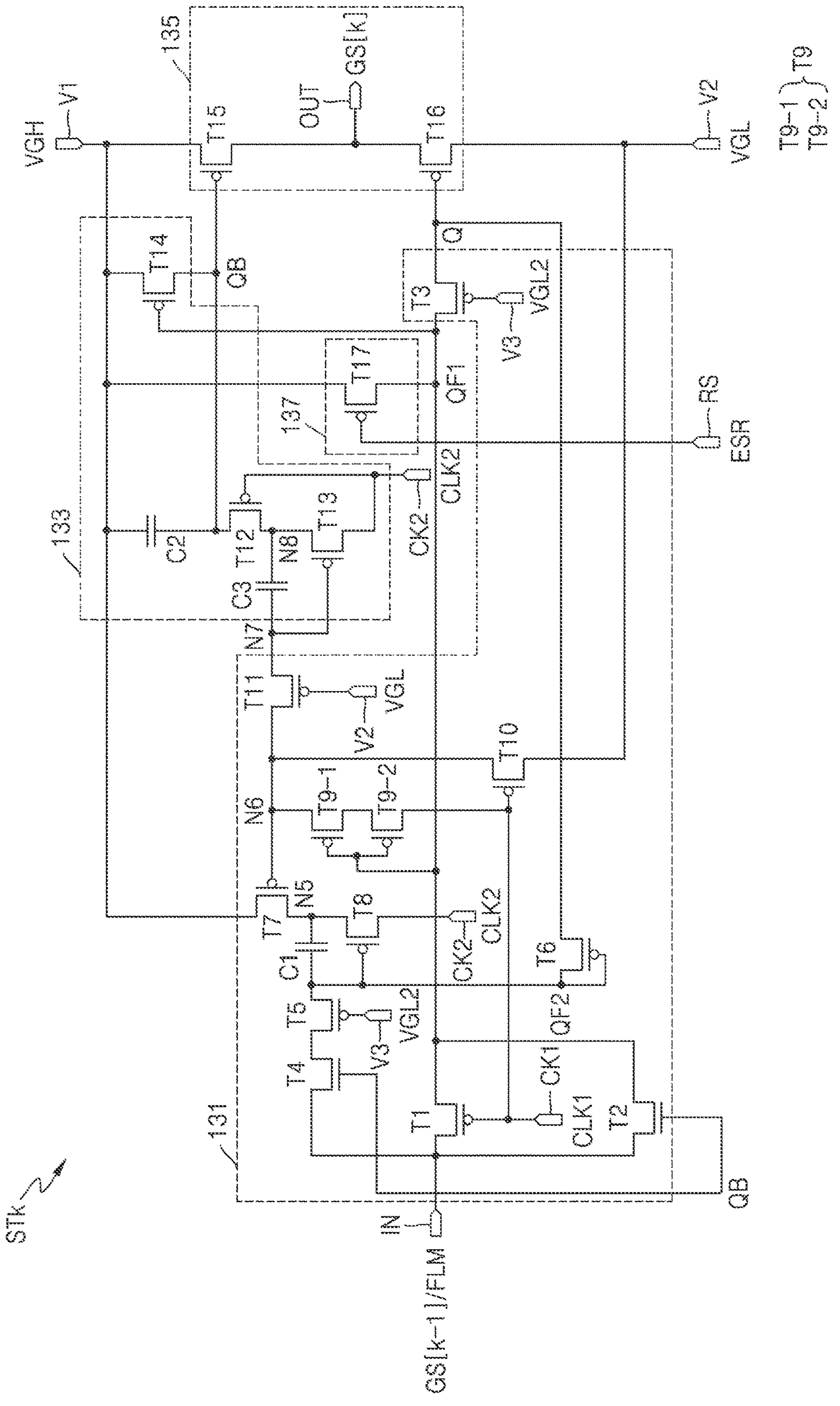
FIG. 3 is a circuit diagram of an example of a stage included in the gate driving circuit of FIG. 2.
Figure 4A:
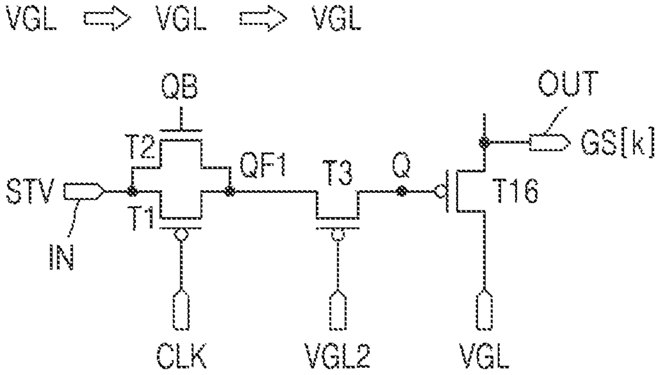
FIGS. 4A and 5A are views for explaining charging and boosting of a first node of FIG. 3.
Figure 4B:
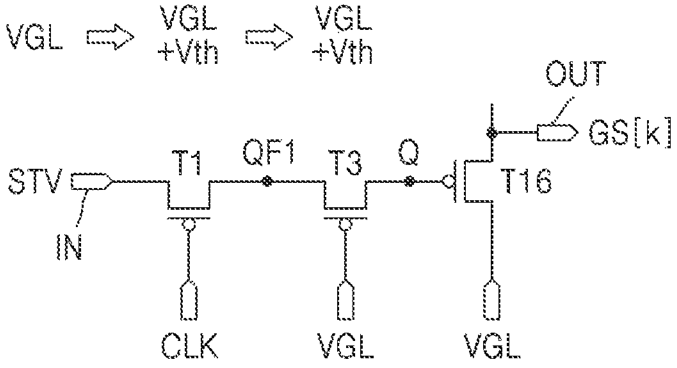
FIGS. 4B and 5B are views showing comparative examples of each of FIGS. 4A and 5A.
Figure 5A:
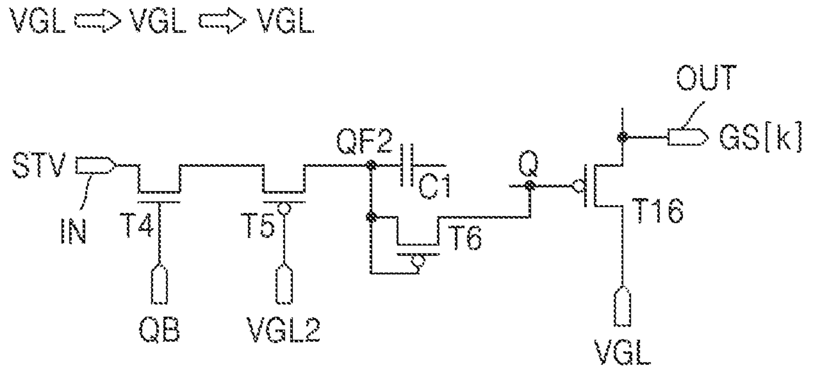
Figure 5B:
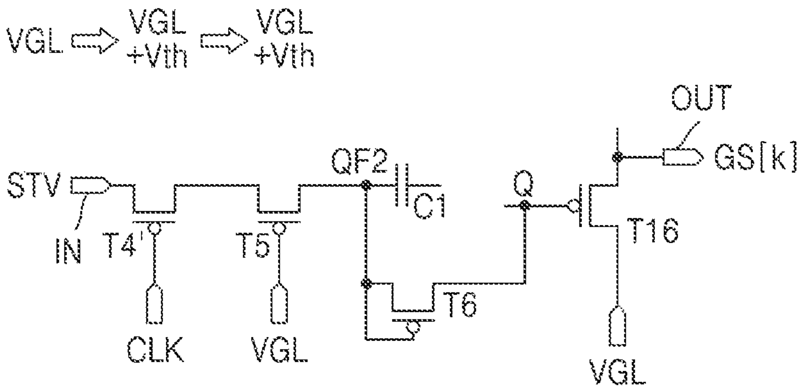
Figure 6:
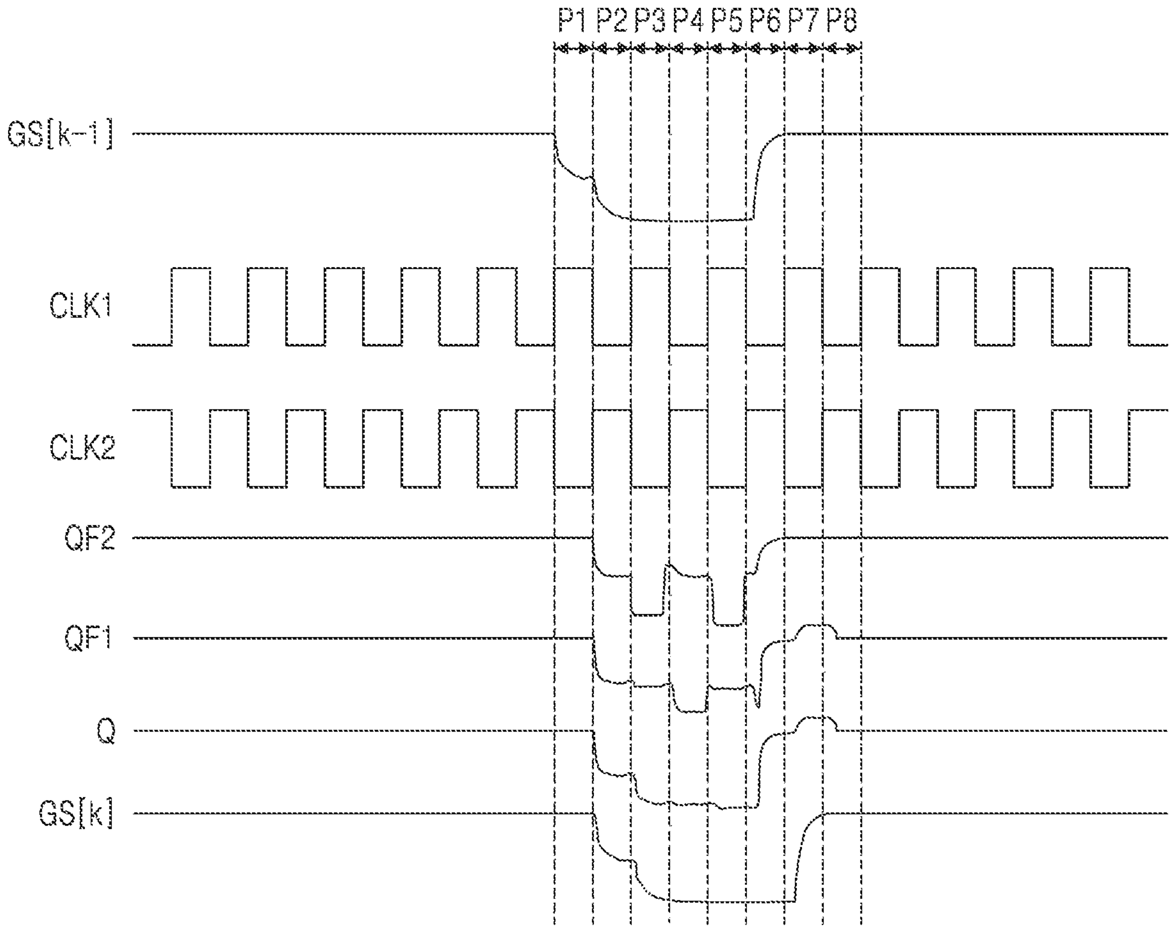
FIG. 6 is a timing diagram for explaining driving of the stage of FIG. 3.

FIG. 2 is a schematic view of a gate driving circuit according to one or more embodiments. FIG. 3 is a circuit diagram of an example of a stage included in the gate driving circuit of FIG. 2. FIGS. 4A and 5A are views for explaining charging and boosting of a first node of FIG. 3. FIGS. 4B and 5B are views showing comparative examples of each of FIGS. 4A and 5A. FIG. 6 is a timing diagram for explaining driving of the stage of FIG. 3.

Referring to FIG. 2, the gate driving circuit 130 may include a plurality of stages ST1 to STn. The plurality of stages ST1 to STn may be configured to sequentially supply gate signals GS[1] to GS[n] to the gate lines. The number of stages provided to the gate driving circuit 130 may be variously modified depending on the number of rows (horizontal lines) provided to the pixel portion 110.

Each of the stages ST1 to STn may be connected to a gate line in a corresponding row. Each of the stages ST1 to STn may be supplied with at least one clock signal and at least one voltage signal, and may be configured to generate gate signals and to supply the gate signals to a gate line connected thereto. That is, each of the stages ST1 to STn may be configured to supply gate signals GS to a gate line provided to a corresponding row.

Each of the plurality of stages ST1 to STn may be configured to output gate signals GS[1], GS[2], GS[3], GS[4], . . . , GS[n] in response to a start signal. As an example, an n-th stage STn may be configured to output an n-th gate signal GS[n] to an n-th gate line. An external signal FLM, which is a start signal of controlling timing of a first gate signal GS[1], may be supplied to a first stage ST1.

Each of the stages ST1 to STn may include an input terminal IN, a first voltage input terminal V1, a second voltage input terminal V2, a third voltage input terminal V3, a first clock terminal CK1, a second clock terminal CK2, a reset terminal RS, and an output terminal OUT.

A start signal may be input (supplied) to the input terminal IN. A start signal may be an external signal FLM or a carry signal. In one or more embodiments, a carry signal may be a gate signal (hereinafter, referred to as a previous gate signal) output by a previous stage. An external signal FLM may be input to an input terminal IN of the first stage ST1, and a previous gate signal may be input as a start signal to an input terminal IN of each of the second to n-th stages ST2 to STn. The previous stage may include at least one previous stage. FIG. 2 shows an example in which a previous stage is an immediately preceding stage. As an example, a third gate signal GS[3] output from the third stage ST3 may be input as a carry signal to an input terminal IN of the fourth stage ST4.

A first voltage VGH may be input to a first voltage input terminal V1, a second voltage VGL may be input to a second voltage input terminal V2, and a third voltage VGL2 may be input to a third voltage input terminal V3. The second voltage VGL may be a voltage level that is less than the first voltage VGH. The third voltage VGL2 may be a voltage level that is less than the second voltage VGL. The first voltage VGH, the second voltage VGL, and the third voltage VGL2 are global signals, and may be input from the controller 170 shown in FIG. 1 and/or a power supply unit not shown.

A first clock signal CLK1 and a second clock signal CLK2 may be input to the first clock terminal CK1 and the second clock terminal CK2. A first clock signal CLK1 and a second clock signal CLK2 may be alternately input to the first clock terminals CK1 of the stages ST1 to STn. A second clock signal CLK2 and a first clock signal CLK1 may be alternately input to the second clock terminals CK2 of the stages ST1 to STn. As an example, a first clock signal CLK1 and a second clock signal CLK2 may be respectively input to the first clock terminal CK1 and the second clock terminal CK2 of odd-numbered stages ST1, ST3, . . . . A second clock signal CLK2 and a first clock signal CLK1 may be respectively input to the first clock terminal CK1 and the second clock terminal CK2 of even-numbered stages ST2, ST4, . . . .

As shown in FIG. 6, a first clock signal CLK1 and a second clock signal CLK2 may be square wave signals in which a high-level voltage and a low-level voltage are repeated. In one or more embodiments, a first clock signal CLK1 and a second clock signal CLK2 may be square wave signals in which a first voltage VGH and a third voltage VGL2 are repeated. In one or more other embodiments, a first clock signal CLK1 and a second clock signal CLK2 may be square wave signals in which a first voltage VGH and a second voltage VGL are repeated. A first clock signal CLK1 and a second clock signal CLK2 may be signals having the same waveform with a shifted phase. As an example, a second clock signal CLK2 may have the same waveform as a first clock signal CLK1, and may be input with a phase shifted (phase-delayed) by an interval (e.g., a preset interval). The second clock signal CLK2 may be shifted by a half cycle from the first clock signal CLK1.

Although it is shown in FIG. 6 that, in a first clock signal CLK1 and a second clock signal CLK2, a period in which a high-level voltage is maintained during one cycle is equal to a period in which a low-level voltage is maintained, the present disclosure is not limited thereto. As an example, in a first clock signal CLK1 and a second clock signal CLK2, a period in which a high-level voltage is maintained during one cycle may be greater than a period in which a low-level voltage is maintained.

Referring to FIG. 2, a reset signal ESR may be input to the reset terminal RS. A reset signal ESR may be input as a gate-on voltage at a timing (e.g., a preset timing) and may be input as a gate-off voltage at other times. As an example, when power is input (power-on) to the display apparatus, a reset signal ESR may be input as a gate-on voltage for a time (e.g., a preset time), and when the time elapses, a reset signal ESR may be input as a gate-off voltage to the stages ST1 to STn. A reset signal ESR may be input as a gate-off voltage while the stages ST1 to STn operate and generate gate signals.

A gate signal may be output from the output terminal OUT. Gate signals GS[1], GS[2], GS[3], GS[4], . . . , GS[n] output from the respective output terminals OUT of the stages ST1 to STn may be sequentially shifted by a period (e.g., a preset period). Each gate signal may be supplied to the pixel through a corresponding output line, for example, a gate line.

Referring to FIG. 3, each of the stages ST1 to STn includes a plurality of nodes. Hereinafter, some of the plurality of nodes are denoted by first to fourth nodes Q, QB, QF1, and QF2.

A stage shown in FIG. 3 is a k-th stage STK (here, k is a positive integer) corresponding to a k-th row of the pixel portion 110. The k-th stage STK may be configured to receive a (k−1)-th gate signal GS[k−1] (hereinafter, also referred to as a previous gate signal GS[k−1]) as a start signal from a (k−1)-th stage, which is a previous stage, to output a k-th gate signal GS[k] (hereinafter, also referred to as a gate signal GS[k]) to a gate line in a k-th row, and to output a k-th gate signal GS[k] as a carry signal to a (k+1)-th stage, which is a next stage.

In odd-numbered stages, the first clock terminal CK1 may be configured to receive a first clock signal CLK1, and the second clock terminal CK2 may be configured to receive a second clock signal CLK2. In even-numbered stages, the first clock terminal CK1 may be configured to receive a second clock signal CLK2, and the second clock terminal CK2 may be configured to receive a first clock signal CLK1. Hereinafter, for convenience of description, an example is described in which a k-th stage STK (hereinafter, a stage STK) is an odd-numbered stage, such that a first clock signal CLK1 is applied to the first clock terminal CK1, and a second clock signal CLK2 is applied to the second clock terminal CK2. When k=1, that is, a first stage ST1 may be configured to receive an external signal FLM as a start signal through the input terminal IN.

Hereinafter, the first voltage VGH may be denoted by a high-level voltage, and the second voltage VGL and the third voltage VGL2 may be denoted by low-level voltages. In addition, a low level may be denoted by a first voltage level, and a high level may be denoted by a second voltage level.

The stage STk may include a first node controller 131, a second node controller 133, and an output unit 135. The first node controller 131, the second node controller 133, and the output unit 135 may each include at least one transistor. The at least one transistor may include an N-type transistor and/or a P-type transistor. As an example, the first transistor T1, the third transistor T3, and the fifth to seventeenth transistors T5 to T17 may be P-type transistors, and the second transistor T2 and the fourth transistor T4 may be N-type transistors. A gate-on voltage of the P-type transistor may be a low-level voltage, and a gate-off voltage of the P-type transistor may be a high-level voltage. A gate-on voltage of the N-type transistor may be a high-level voltage, and a gate-off voltage of the N-type transistor may be a low-level voltage.

The first node controller 131 may be connected between the input terminal IN and the first node Q. The first node controller 131 may be configured to control the voltage of the first node Q in response to signals input to the input terminal IN, the first clock terminal CK1, and the second clock terminal CK2. As an example, the first node controller 131 may be configured to control the voltage of the first node Q in response to a start signal (e.g., an external signal FLM or a previous gate signal GS[k−1]), a first clock signal CLK1, and a second clock signal CLK2. The first node controller 131 may include the first to eleventh transistors T1 to T11 and a first capacitor C1.

The first transistor T1 may be connected between the input terminal IN and the first node Q. The first transistor T1 may be connected between the input terminal IN and the third node QF1. A gate of the first transistor T1 may be connected to the first clock terminal CK1. When a first clock signal CLK1 applied to the first clock terminal CK1 is in a low level, the first transistor T1 may be turned on, and may be configured to transfer a start signal applied to the input terminal IN to the third node QF1.

The second transistor T2 may be connected between the input terminal IN and the first node Q. The second transistor T2 may be connected between the input terminal IN and the third node QF1. The second transistor T2 may be parallel-connected to the first transistor T1. A gate of the second transistor T2 may be connected to the second node QB. When the voltage of the second node QB is in a high level, the second transistor T2 may be turned on, and may be configured to transfer a start signal applied to the input terminal IN to the third node QF1. The second transistor T2 may be a compensation transistor configured to compensate for a voltage loss of a start signal due to a threshold voltage of the first transistor T1 when the first transistor T1 transfers the start signal to the third node QF1.

The third transistor T3 may be connected between the third node QF1 and the first node Q. A gate of the third transistor T3 may be connected to the third voltage input terminal V3. The third transistor T3 may be turned on by a third voltage VGL2 applied to the third voltage input terminal V3, and may connect the third node QF1 to the first node Q.

The first transistor T1, the second transistor T2, and the third transistor T3 may constitute a first circuit portion configured to transfer a start signal input to the input terminal IN to the first node Q.

The fourth transistor T4 may be connected between the input terminal IN and the fourth node QF2. The fourth transistor T4 may be connected between the input terminal IN and the fifth transistor T5. A gate of the fourth transistor T4 may be connected to the second node QB. When the voltage of the second node QB is in a high level, the fourth transistor T4 may be turned on, and may be configured to transfer a start signal to the fourth node QF2 through the fifth transistor T5. The fourth transistor T4 may be implemented as an N-type transistor, and may be configured to transfer a start signal to the fourth node QF2 without a voltage loss of the start signal.

The fifth transistor T5 may be connected between the input terminal IN and the fourth node QF2. The fifth transistor T5 may be connected between the fourth transistor T4 and the fourth node QF2. A gate of the fifth transistor T5 may be connected to the third voltage input terminal V3. The fifth transistor T5 may be turned on by the third voltage VGL2 applied to the third voltage input terminal V3, and may be configured to transfer a start signal input through the fourth transistor T4 to the fourth node QF2. The fifth transistor T5 may be always in a turn-on state. The fifth transistor T5 may be configured to reduce or prevent a line voltage drop and the like between the input terminal IN and the fourth node QF2 (or the first node Q).

The sixth transistor T6 may be connected between the fourth node QF2 and the first node Q. A gate of the sixth transistor T6 may be connected to the fourth control node QF2. The sixth transistor T6 may be a diode-connected transistor having a gate and one terminal connected to the fourth node QF2. The sixth transistor T6 may be turned on when the voltage of the fourth node QF2 is in a low level. When the voltage of the fourth node QF2 is boosted to a voltage that is less than the second voltage VGL by the first capacitor C1, the sixth transistor T6 may be turned on, and may be configured to boost the voltage of the first node Q to a voltage (e.g., a voltage that is less than the second voltage VGL) of the fourth node QF2.

The first capacitor C1 may be connected between the fourth node QF2 and a fifth node N5. The first capacitor C1 may be configured to boost the voltages of the fourth node QF2 and the first node Q in response to a change in a voltage level of the fifth node N5 due to a voltage level of a signal input to the second clock terminal CK2.

The fourth transistor T4, the fifth transistor T5, the sixth transistor T6, and the first capacitor C1 may constitute a second circuit portion configured to boost a start signal input to the input terminal IN at the fourth node QF2, and to transfer the same to the first node Q.

The seventh transistor T7 may be connected between the first voltage input terminal V1 and the fifth node N5. A gate of the seventh transistor T7 may be connected to a sixth node N6. The seventh transistor T7 may be turned on or turned off according to a voltage level of the sixth node N6.

The eighth transistor T8 may be connected between the fifth node N5 and the second clock terminal CK2. A gate of the eighth transistor T8 may be connected to the fourth node QF2. The eighth transistor T8 may be turned on or turned off according to a voltage level of the fourth node QF2. When the voltage of the fourth node QF2 is a low voltage, the eighth transistor T8 may be turned on, and may be configured to transfer a signal input to the second clock terminal CK2 to the fifth node N5.

The ninth transistor T9 may be connected between the sixth node N6 and the first clock terminal CK1. The ninth transistor T9 may include a plurality of sub-transistors connected in series. The sub-transistors may include a pair of a (9-1)st transistor T9-1 and a (9-2)nd transistor T9-2. Each of the (9-1)st transistor T9-1 and the (9-2)nd transistor T9-2 may include a commonly connected gate. Because the ninth transistor T9 includes a plurality of sub-transistors, a leakage current of the ninth transistor T9 may be reduced. The ninth transistor T9 may be turned on or turned off according to a voltage level of the third node QF1.

The tenth transistor T10 may be connected between the sixth node N6 and the second voltage input terminal V2. A gate of the tenth transistor T10 may be connected to the first clock terminal CK1. The tenth transistor T10 may be turned on or turned off depending on a voltage level of a signal input to the first clock terminal CK1.

The eleventh transistor T11 may be connected between the sixth node N6 and a seventh node N7. A gate of the eleventh transistor T11 may be connected to the second voltage input terminal V2. The eleventh transistor T11 may be turned on by the second voltage VGL applied to the second voltage input terminal V2, and may connect the sixth node N6 to the seventh node N7.

The third transistor T3 and the eleventh transistor T11 may be always in a turn-on state. Each of the third transistor T3 and the eleventh transistor T11 may be configured to reduce or prevent a line voltage drop between nodes whose two opposite ends are connected. As an example, the third transistor T3 may be configured to reduce or prevent a line voltage drop between the third node QF1 and the first node Q, and the eleventh transistor T11 may be configured to reduce or prevent a line voltage drop between the sixth node N6 and the seventh node N7. In one or more other embodiments, at least one of the third transistor T3 and the eleventh transistor T11 may be omitted. In the case where the third transistor T3 is omitted, the first transistor T1 and the second transistor T2 may be connected between the input terminal IN and the first node Q without the third node QF1, and may transfer a start signal to the first node Q.

The second node controller 133 may be connected between the seventh node N7 and the second node QB. The second node controller 133 may be configured to control the voltage of the second node QB in response to signals input to the first voltage input terminal V1 and the second clock terminal CK2. As an example, the second node controller 133 may be configured to control the voltage of the second node QB in response to the first voltage VGH and the second clock signal CLK2. A voltage level of the voltage of the second node QB may be an inversion of a voltage level of the voltage of the first node Q. The second node controller 133 may include the twelfth to fourteenth transistors T12 to T14, a second capacitor C2, and a third capacitor C3.

The twelfth transistor T12 may be connected between the second node QB and the eighth node N8. A gate of the twelfth transistor T12 may be connected to the second clock terminal CK2. When a second clock signal CLK2 input to the second clock terminal CK2 is in a low level, the twelfth transistor T12 may be turned on, and may electrically connect the eighth node N8 to the second node QB.

The thirteenth transistor T13 may be connected between the eighth node N8 and the second clock terminal CK2. A gate of the thirteenth transistor T13 may be connected to the seventh node N7. The thirteenth transistor T13 may be turned on or turned off according to a voltage level of the seventh node N7. When the voltage of the seventh node N7 is a low voltage, the thirteenth transistor T13 may be turned on, and may be configured to transfer a second clock signal CLK2 of the second clock terminal CK2 to the eighth node N8.

The fourteenth transistor T14 may be connected between the first voltage input terminal V1 and the second node QB. A gate of the fourteenth transistor T14 may be connected to the third node QF1. The fourteenth transistor T14 may be turned on or turned off according to a voltage level of the third node QF1. When the voltage of the third node QF1 is a low level, the fourteenth transistor T14 may be turned on, and may be configured to transfer the first voltage VGH input to the first voltage input terminal V1 to the second node QB.

The second capacitor C2 may be connected between the first voltage input terminal V1 and the second node QB. The third capacitor C3 may be connected between the seventh node N7 and the eighth node N8.

The output unit 135 may be connected between the first voltage input terminal V1 and the second voltage input terminal V2. The output unit 135 may be configured to output a gate signal GS[k] of a gate-on voltage or a gate-off voltage depending on a voltage level of the first node Q and the second node QB. The output unit 135 may include the fifteenth transistor T15 and the sixteenth transistor T16.

The fifteenth transistor T15 may be connected between the first voltage input terminal V1 and the output terminal OUT. A gate of the fifteenth transistor T15 may be connected to the second node QB. The fifteenth transistor T15 may be a pull-up transistor configured to transfer a high-level voltage to the output terminal OUT. When the voltage of the second node QB is a low level, the fifteenth transistor T15 may be turned on, and may be configured to transfer the first voltage VGH input to the first voltage input terminal V1 to the output terminal OUT.

The sixteenth transistor T16 may be connected between the output terminal OUT and the second voltage input terminal V2. A gate of the sixteenth transistor T16 may be connected to the first node Q. The sixteenth transistor T16 may be a pull-down transistor configured to transfer a low-level voltage to the output terminal OUT. When the voltage of the first node Q is a low level, the sixteenth transistor T16 may be turned on, and may be configured to transfer the second voltage VGL input to the second voltage input terminal V2 to the output terminal OUT.

The stage STK may further include a reset portion 137. The reset portion 137 may be configured to reset the third node QF1 based on a reset signal ESR supplied to the reset terminal RS. The reset portion 137 may include the seventeenth transistor T17 (a reset transistor). The seventeenth transistor T17 may be connected between the first voltage input terminal V1 and the third node QF1. A gate of the seventeenth transistor T17 may be connected to the reset terminal RS. When a reset signal ESR of a low level is applied to the reset terminal RS, the seventeenth transistor T17 may be turned on, and because the third node QF1 becomes a high-level state by the first voltage VGH, the sixteenth transistor T16 may maintain a turn-off state. Accordingly, while the gate driving circuit 130 does not operate, the likelihood of the sixteenth transistor T16 being turned on, and the likelihood of a gate signal of a low-level being output, may be reduced or prevented. While the gate driving circuit 130 operates, because a reset signal ESR may be supplied as a high-level voltage, the seventeenth transistor T17 may be turned off.

FIG. 4A is a portion of the stage STK shown in FIG. 3, and shows the first to third transistors T1 to T3 and the sixteenth transistor T16 on a charging path of the first node Q. FIG. 4B is a comparative example of FIG. 4A and shows an example in which the second transistor T2 of FIG. 4A is omitted, and in which the second voltage VGL is input to the gate of the third transistor T3.

In the comparative example of FIG. 4B, when a start signal STV of a low level input as the second voltage VGL is transferred to the first node Q by the first transistor T1 and the third transistor T3 that are turned on, a voltage loss as much as a threshold voltage Vth of the first transistor T1 by the turn-on of the first transistor T1 at the third node QF1, and a voltage loss as much as a threshold voltage Vth of the third transistor T3 by the turn-on of the third transistor T3 at the first node Q, may occur. Accordingly, because a voltage level of a voltage charged at the first node Q becomes higher than a voltage level of the second voltage VGL, a gate-on voltage of a sufficient voltage level to stably turn on the sixteenth transistor T16 cannot be secured.

In contrast, as shown in FIG. 4A, in one or more embodiments, because the second transistor T2 of an N-type is provided in parallel with the first transistor T1 of a P-type, when a start signal STV input as the second voltage VGL is transferred to the third node QF1 through the first transistor T1 and the second transistor T2 that are turned on, a voltage loss corresponding to the threshold voltage Vth of the first transistor T1 may be compensated for. In addition, because the third voltage VGL2, which is of a voltage level that is less than a voltage level of the second voltage VGL, is input to the gate of the third transistor T3, and because stable turn-on of the third transistor T3 is secured, when a start signal STV input as the second voltage VGL is transferred to the first node Q through the third transistor T3 that is turned on, a voltage loss corresponding to the threshold voltage Vth of the third transistor T3 may be compensated for. Accordingly, a gate-on voltage of a sufficient voltage level to stably turn on the sixteenth transistor T16 may be secured.

FIG. 5A is a portion of the stage STK shown in FIG. 3 and shows the fourth transistor T4 and the fifth transistor T5 on a charging path of the fourth node QF2, which is a node (a boosting node) for boosting the voltage of the first node Q, shows the sixth transistor T6 and the first capacitor C1 connected to the fourth node QF2, and shows the sixteenth transistor T16. FIG. 5B is a comparative example of FIG. 5A, and shows an example in which, instead of the fourth transistor T4 of an N-type in FIG. 5A, a fourth transistor T4' of a P-type with a gate to which a clock signal CLK is input is provided, and the second voltage VGL is input to the gate of the fifth transistor T5.

In the comparative example of FIG. 5B, when a start signal STV of a low level input as the second voltage VGL is transferred to the fourth node QF2 by the fourth transistor T4' and the fifth transistor T5 that are turned on, voltage losses as much as threshold voltages of the fourth transistor T4' and the fifth transistor T5 by the turn-on of the fourth transistor T4' and the fifth transistor T5 may occur. Accordingly, because a voltage level of a voltage charged at the fourth node QF2 becomes higher than a voltage level of the second voltage VGL, a gate-on voltage of a sufficient voltage level to stably turn on the sixteenth transistor T16 might not be secured.

In contrast, as shown in FIG. 5A, in one or more embodiments, because a start signal STV input as the second voltage VGL is output through the fourth transistor T4 of an N-type, a voltage loss corresponding to the threshold voltage Vth of the fourth transistor T4 may not occur. In addition, because the third voltage VGL2 of a voltage level that is less than a voltage level of the second voltage VGL is input to the gate of the fifth transistor T5, and because stable turn-on of the fifth transistor T5 is secured, when a start signal STV input as the second voltage VGL is transferred to the fourth node QF2 through the fifth transistor T5 that is turned on, a voltage loss corresponding to the threshold voltage Vth of the fifth transistor T5 may be compensated for. Accordingly, a gate-on voltage of a sufficient voltage level to stably turn on the sixteenth transistor T16 may be secured.

Hereinafter, an operation of the stage STK shown in FIG. 3 is described with reference to FIG. 6. In FIG. 6, a previous gate signal GS[k−1] as a start signal, a first clock signal CLK1, a second clock signal CLK2, node voltages of the first node Q, the third node QF1, and the fourth node QF2, and a gate signal GS[k] as an output signal are shown.

During a first period P1, a previous gate signal GS[k−1] may be supplied in a low level as a start signal from a previous stage, a first clock signal CLK1 of a high level may be supplied to the first clock terminal CK1, and a second clock signal CLK2 of a low level may be supplied to the second clock terminal CK2.

The twelfth transistor T12 may be turned on by a second clock signal CLK2 of a low level. A second clock signal CLK2 of a low level may be supplied to the eighth node N8 by the thirteenth transistor T13 maintaining a turn-on state, and the voltage of the second node QB may maintain a low-level voltage by the twelfth transistor T12 that is turned on. Accordingly, the fifteenth transistor T15 may maintain a turn-on state, and a gate signal GS[k] may be output as a high level of the first voltage VGH.

The first transistor T1 may be turned off by a first clock signal CLK1 of a high level, and the second transistor T2 and the fourth transistor T4 may be turned off by the second node QB of a low level. Accordingly, the voltages of the first node Q, the third node QF1, and the fourth node QF2 may maintain a high-level voltage before the first period P1.

During a second period P2, a previous gate signal GS[k−1] may be supplied in a low level, a first clock signal CLK1 may be supplied in a low level, and a second clock signal CLK2 may be supplied in a high level.

The first transistor T1 may be turned on by a first clock signal CLK1 of a low level, and a previous gate signal GS[k−1] of a low level may be supplied to the third node QF1. The first node Q may have a low-level voltage by the third transistor T3 that is turned on. Accordingly, because the sixteenth transistor T16 may be turned on, a gate signal GS[k] may be output in a voltage level of a supplied previous gate signal GS[k−1], that is, in a low level.

Because the fourteenth transistor T14 may be turned on by the third node QF1 of a low level, the second node QB may have a high-level voltage of the first voltage VGH, and the fifteenth transistor T15 may be turned off.

Because, when the first transistor T1 is turned on, the second transistor T2 is turned on by the second node QB of a high level, the third node QF1 may be charged to a voltage level of the previous gate signal GS[k−1] without a voltage loss of the previous gate signal GS[k−1] due to the threshold voltage of the first transistor T1. In addition, because the third transistor T3 is turned on by the third voltage VGL2, the first node Q may have a voltage of the third node QF1, that is, a low-level voltage of the previous gate signal GS[k−1] without a voltage loss.

In addition, because a voltage of a previous gate signal GS[k−1] is transferred to the fifth transistor T5 without a voltage loss by the fourth transistor T4 that is turned on by the second node QB of a high level, and because the fifth transistor T5 is turned on by the third voltage VGL2, the fourth node QF2 may have a low-level voltage of the previous gate signal GS[k−1] transferred by the fourth transistor T4 without a voltage loss.

The seventh transistor T7 may be turned on by the fourth node QF2 of a low level, the ninth transistor T9 with a gate connected to the third node QF1 may be turned on, and the tenth transistor T10 may be turned on by a first clock signal CLK1 of a low level. Accordingly, the sixth node N6 may have a voltage of a low level, and the fifth node N5 may have a voltage of a high level.

During a third period P3, a previous gate signal GS[k−1] may be supplied in a low level, a first clock signal CLK1 may be supplied in a high level, and a second clock signal CLK2 may be supplied in a low level.

Because the first transistor T1 is turned off by a first clock signal CLK1 of a high level, and because the second transistor T2 is turned on by the second node QB of a high level, the third node QF1 may have a voltage level of a previous gate signal GS[k−1], that is, a low-level voltage of the second voltage VGL. Because the fourteenth transistor T14 may maintain a turn-on state by the third node QF1 of a low level, the second node QB may have a high-level voltage of the first voltage VGH, and the fifteenth transistor T15 may maintain a turn-off state.

The tenth transistor T10 may be turned off by a first clock signal CLK1, the sixth node N6 may have a high-level voltage of a first clock signal CLK1 by the ninth transistor T9 maintaining a turn-on state, and the seventh transistor T7 may be turned off. The fourth node QF2 may have a low level due to the fourth transistor T4 turned on by the second node QB of a high level and due to the fifth transistor T5 turned on by the third voltage VGL2. While the voltage of the fifth node N5 drops from a high level to a low level by the eighth transistor T8 whose gate is connected to the fourth node QF2 and turned on, the fourth node QF2 is boosted to a voltage level that is less than a voltage level in the second period P2 by coupling of the first capacitor C1, and the first node Q may have a voltage of a low level corresponding to a voltage of the fourth node QF2 through the sixth transistor T6. Accordingly, the sixteenth transistor T16 may maintain a turn-on state, and a gate signal GS[k] may be output in a voltage level of a previous gate signal GS[k−1], that is, the second voltage VGL.

Because the thirteenth transistor T13 is turned off by the seventh node N7 of a high level, and because the twelfth transistor T12 is turned on by a second clock signal CLK2 of a low level, the eighth node N8 may have a high-level voltage.

During a fourth period P4, a previous gate signal GS[k−1] may be supplied in a low level, a first clock signal CLK1 may be supplied in a low level, and a second clock signal CLK2 may be supplied in a high level.

Because the fourteenth transistor T14 may be turned on by the third node QF1 of a low level, the second node QB may have a high-level voltage of the first voltage VGH, and the fifteenth transistor T15 may maintain a turn-off state.

Because the first transistor T1 is turned on by a first clock signal CLK1 of a low level, and because the second transistor T2 is turned on by the second node QB of a high level, a previous gate signal GS[k−1] of a low level may be supplied to the third node QF1. The third node QF1 may have the same low-level voltage as a voltage of the first node Q due to the third transistor T3 that is turned on. A gate signal GS[k] may be output in a voltage level of a previous gate signal GS[k−1], that is, the second voltage VGL by the sixteenth transistor T16 maintaining a turn-on state.

The fourth transistor T4 may maintain a turn-on state due to the second node QB of a high level, the fourth node QF2 may have a low level due to the fifth transistor T5 being turned on, and the eighth transistor T8 may maintain a turn-on state. In this case, because the tenth transistor T10 may be turned on by a first clock signal CLK1 of a low level, the sixth node N6 may have a low-level voltage. While the fifth node N5 is raised from a low level to a high level by the seventh transistor T7 and the eighth transistor T8 that are turned on, the fourth node QF2 may have a voltage of a low level that is greater than a voltage level in the third period P3 due to coupling of the first capacitor C1.

During a fifth period P5, a previous gate signal GS[k−1] may be supplied in a low level, a first clock signal CLK1 may be supplied in a high level, and a second clock signal CLK2 may be supplied in a low level.

Because the first transistor T1 is turned off by a first clock signal CLK1 of a high level, and because the second transistor T2 is turned on by the second node QB of a high level, the third node QF1 may have a voltage level of a previous gate signal GS[k−1], that is, a low-level voltage of the second voltage VGL. Because the fourteenth transistor T14 may maintain a turn-on state by the third node QF1 of a low level, the second node QB may have a high-level voltage of the first voltage VGH, and the fifteenth transistor T15 may maintain a turn-off state.

The tenth transistor T10 may be turned off by a first clock signal CLK1, the sixth node N6 may have a high-level voltage of a first clock signal CLK1 by the ninth transistor T9 maintaining a turn-on state, and the seventh transistor T7 may be turned off. The fourth node QF2 may have a low level due to the fourth transistor T4 being turned on by the second node QB of a high level and the fifth transistor T5 being turned on by the third voltage VGL2. While the voltage of the fifth node N5 drops from a high level to a low level by the eighth transistor T8 whose gate is connected to the fourth node QF2 and that is turned on, the fourth node QF2 is boosted to a voltage level that is less than a voltage level in the fourth period P4 due to coupling of the first capacitor C1, and the first node Q may have a voltage of a low level corresponding to a voltage of the fourth node QF2 through the sixth transistor T6. Accordingly, the sixteenth transistor T16 may maintain a turn-on state, a gate signal GS[k] may be output in a voltage level of a previous gate signal GS[k−1], that is, the second voltage VGL.

Because the thirteenth transistor T13 is turned off by the seventh node N7 of a high level, and because the twelfth transistor T12 is turned on by a second clock signal CLK2 of a low level, the eighth node N8 may have a high-level voltage.

During a sixth period P6, a previous gate signal GS[k−1] may be supplied in a high level, a first clock signal CLK1 may be supplied in a low level, and a second clock signal CLK2 may be supplied in a high level.

The first transistor T1 may be turned on by a first clock signal CLK1 of a low level, and a previous gate signal GS[k−1] of a high level may be supplied to the third node QF1. The third node QF1 may have the same high-level voltage as a voltage of the first node Q due to the third transistor T3 that is turned on. Accordingly, the sixteenth transistor T16 may be turned off.

Because the fourteenth transistor T14 is turned off by the third node QF1 of a high level, and because the twelfth transistor T12 is turned off by a second clock signal CLK2 of a high level, the voltage of the second node QB may drop from a high-level voltage to a low-level voltage. Accordingly, the fifteenth transistor T15 may be turned on, and a gate signal GS[k] may be output as a high level of the first voltage VGH.

During a seventh period P7, a previous gate signal GS[k−1] may be supplied in a high level, a first clock signal CLK1 may be supplied in a high level, and a second clock signal CLK2 may be supplied in a low level.

The second node QB may maintain a low-level voltage due to the twelfth transistor T12 and the thirteenth transistor T13 that are turned on by a second clock signal CLK2 of a low level. Accordingly, the fifteenth transistor T15 may maintain a turn-on state, and a gate signal GS[k] may be output as a high level of the first voltage VGH.

During an eighth period P8, a previous gate signal GS[k−1] may be supplied in a high level, a first clock signal CLK1 may be supplied in a low level, and a second clock signal CLK2 may be supplied in a high level.

Because the first transistor T1 is turned on by a first clock signal CLK1 of a low level, the voltage of the first node Q and the third node QF1 may maintain a high-level voltage of a previous gate signal GS[k−1]. Because the twelfth transistor T12 is turned off by a second clock signal CLK2 of a high level, and because the voltage of second node QB maintains a low-level voltage, the fifteenth transistor T15 is turned on and a gate signal GS[k] may be output in a high level of the first voltage VGH.

Figure 7:
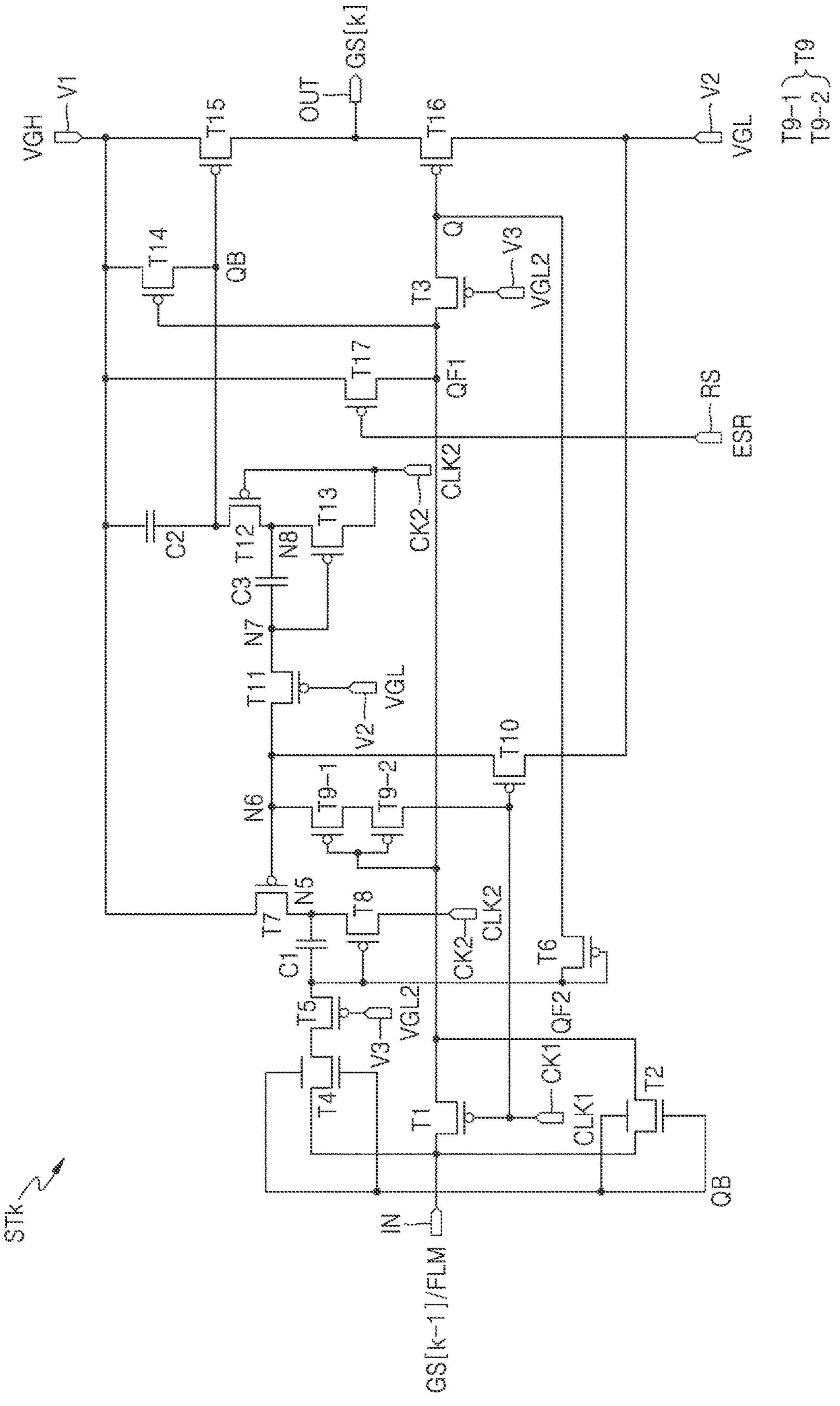
FIG. 7 is a circuit diagram of an example of a stage included in the gate driving circuit of FIG. 2.

FIG. 7 is a circuit diagram of an example of a stage included in the gate driving circuit of FIG. 2. In FIG. 7, same reference numerals are used for same elements as those described with reference to FIG. 3, and repeated descriptions thereof are omitted. In addition, the stage of FIG. 7 is substantially the same as or similar to the stage of FIG. 3 except for the construction of the second transistor T2 and the fourth transistor T4. The stage shown in FIG. 7 may be driven with the timing shown in FIG. 6.

In the stage STK shown in FIG. 3, the second transistor T2 and the fourth transistor T4 are N-type transistors including one gate connected to the second node QB. In the stage STK shown in FIG. 7, the second transistor T2 and the fourth transistor T4 are N-type dual-gate transistors including a pair of a first gate and a second gate connected to the second node QB. In one or more embodiments, the pair of the first gate and the second gate may each be located on different layers with a semiconductor therebetween. As an example, the first gate may be a top gate located on the semiconductor, and the second gate may be a bottom gate located under the semiconductor. In the case where an oxide transistor is a dual-gate transistor including a pair of gates, an external light-blocking effect may be obtained by a bottom gate while reducing the size (e.g., a channel width compared to a channel length (W/L)) of the transistor.

Figure 8:
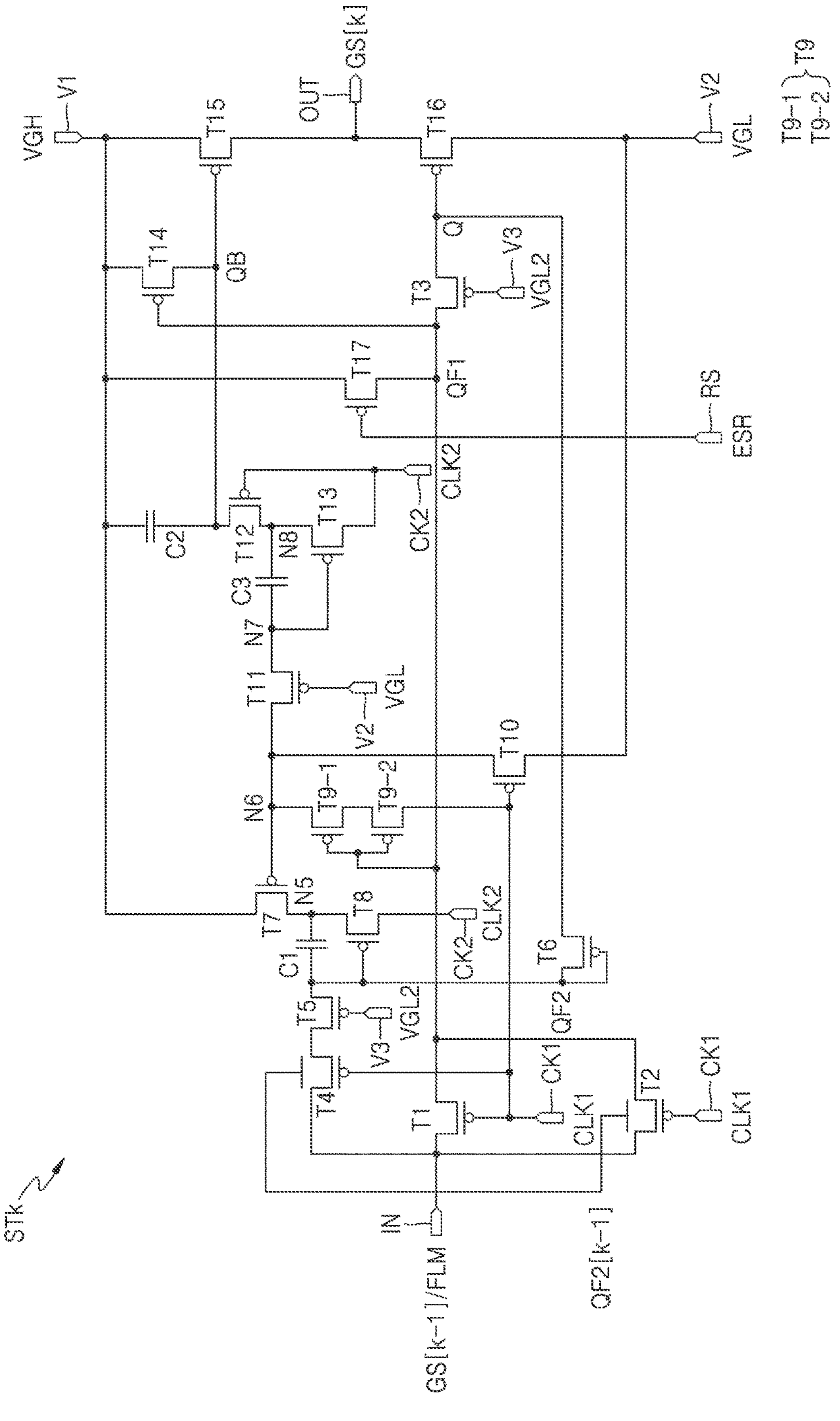
FIG. 8 is a circuit diagram of an example of a stage included in the gate driving circuit of FIG. 2.
Figure 9:
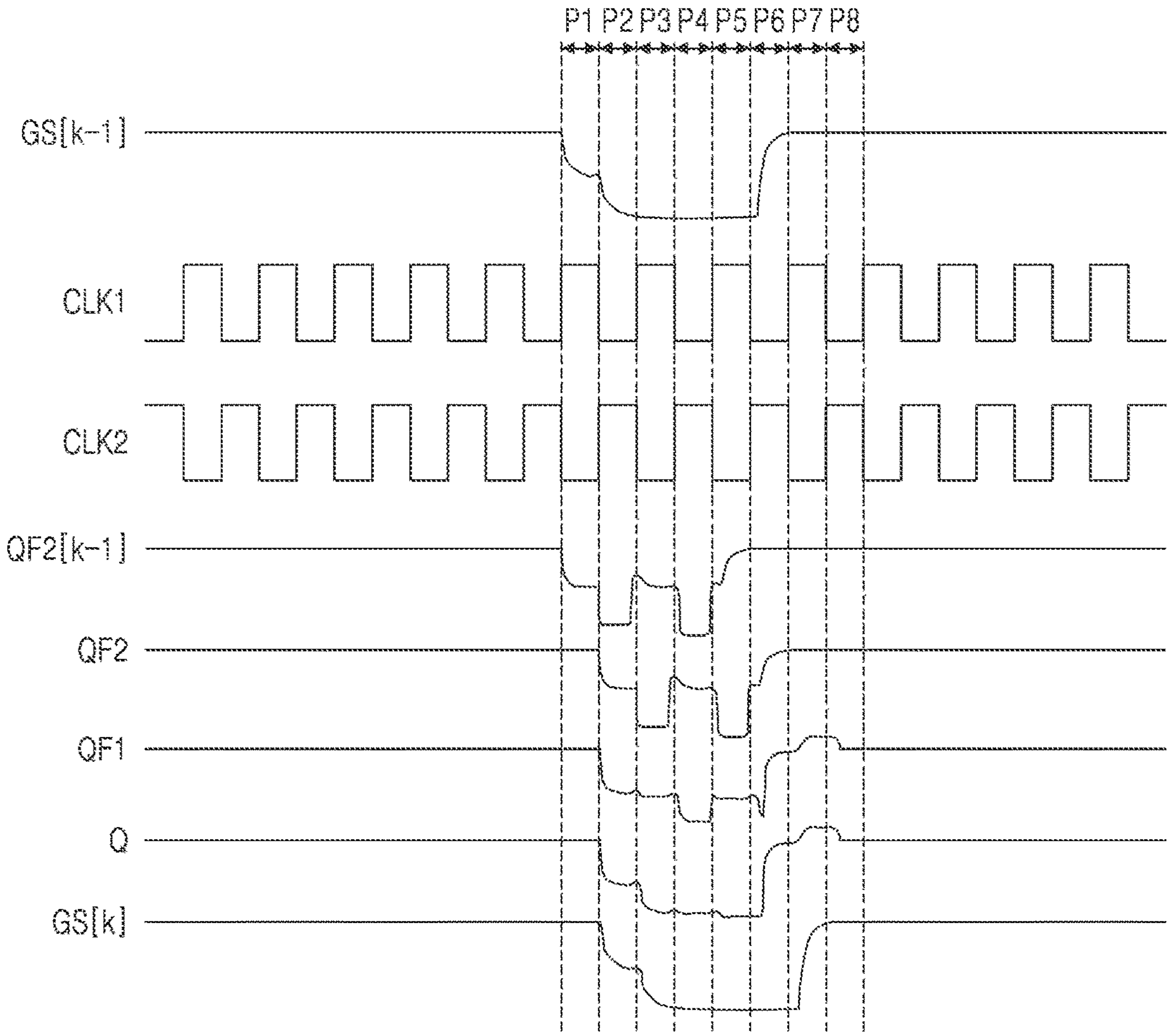
FIG. 9 is a timing diagram for explaining driving of the stage of FIG. 8.

FIG. 8 is a circuit diagram of an example of a stage included in the gate driving circuit of FIG. 2. FIG. 9 is a timing diagram for explaining driving of the stage of FIG. 8.

In one or more embodiments, at least one dummy stage may be further provided in front of the first stage ST1 among the stages ST1 to STn. The dummy stage may equally operate with the same construction as those of the stages ST1 to STn. The dummy stage may not be connected to a gate line of the pixel portion 110 (see FIG. 1). In one or more embodiments, the dummy stage may be connected to a dummy gate line, but the dummy gate line may be connected to a dummy pixel that does not display images, and may not be used in displaying images. In one or more embodiments, the dummy pixel may be omitted, and only a dummy gate line may be provided around the pixel portion 110. In one or more embodiments, the dummy stage may be configured to supply a voltage of a node (e.g., a preset node) to the first stage ST1. As an example, the dummy stage may be configured to supply a voltage of the fourth node QF2 to the first stage ST1.

In FIG. 8, same reference numerals are used for same elements as those described with reference to FIG. 3, and repeated descriptions thereof are omitted. In addition, the stage of FIG. 8 is substantially the same as or similar to the stage of FIG. 3 except for the construction of the second transistor T2 and the fourth transistor T4. A timing diagram that describes driving of the stage shown in FIG. 9 is the same as a timing diagram that describes driving of the stage shown in FIG. 6 except for addition of a waveform diagram of the fourth node QF2[k−1] of the (k−1)-th stage, which is a previous stage.

In the stage STK shown in FIG. 8, the second transistor T2 and the fourth transistor T4 are P-type dual-gate silicon transistors including a pair of a first gate and a second gate. The first gates of the second transistor T2 and the fourth transistor T4 may be connected to the first clock terminal CK1, and the second gates thereof may be connected to the fourth node QF2[k−1] of the (k−1)-th stage, which is a previous stage. The second transistor T2 and the fourth transistor T4 may be turned on or turned off depending on a voltage level of a clock signal input to the first clock terminal CK1. Because the second transistor T2 and the fourth transistor T4 are implemented as P-type silicon transistors having four terminals, the threshold voltages of the second transistor T2 and the fourth transistor T4 may be adjusted by adjusting a bias voltage input to the second gate. Because the amount of voltage loss of a signal transferred by the P-type silicon transistor is reduced by adjusting the threshold voltage, an equal or similar effect to an N-type oxide transistor may be obtained. For a bias voltage input to the second gates of the second transistor T2 and the fourth transistor T4, a node voltage inside the gate driving circuit 130 may be used. The stage STK shown in FIG. 8 shows an example in which a bias voltage input to the second gates of the second transistor T2 and the fourth transistor T4 is a voltage of the fourth node QF2[k−1] of a previous stage.

Figure 10:
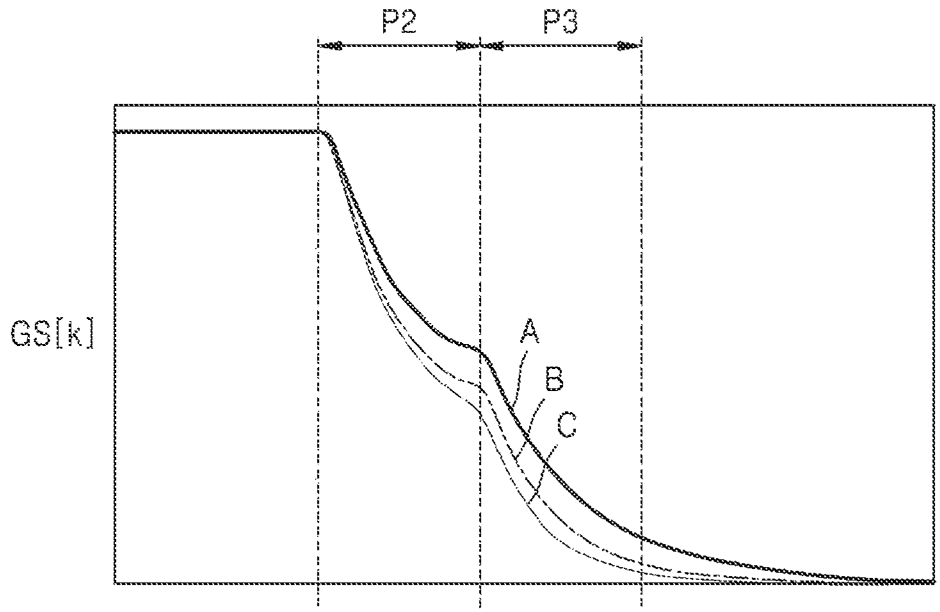
FIG. 10 is an enlarged view of a portion of a waveform of a gate signal.

FIG. 10 is an enlarged view of a portion of a waveform of a gate signal. A waveform A is a waveform of a gate signal according to comparative examples of FIGS. 4B and 5B. A waveform C is a waveform of a gate signal according to the one or more embodiments corresponding to FIG. 3. A waveform B is a waveform of a gate signal according to the one or more embodiments corresponding to FIG. 8.

Referring to FIGS. 6, 9, and 10 together, a start signal changes from a high level to a low level, and then, in the second period P2 and the third period P3, a gate signal GS[k] may drop in response to a voltage level of a clock signal input to the first clock terminal CK1. A falling speed of a gate signal GS[k] increases, and a falling time may decrease, in the order of the waveform C, the waveform B, and the waveform A. That is, according to the above embodiments, a gate-on voltage of a sufficient voltage level to stably turn on the pull-down transistor (e.g., the sixteenth transistor T16) may be swiftly secured.

Figure 11:
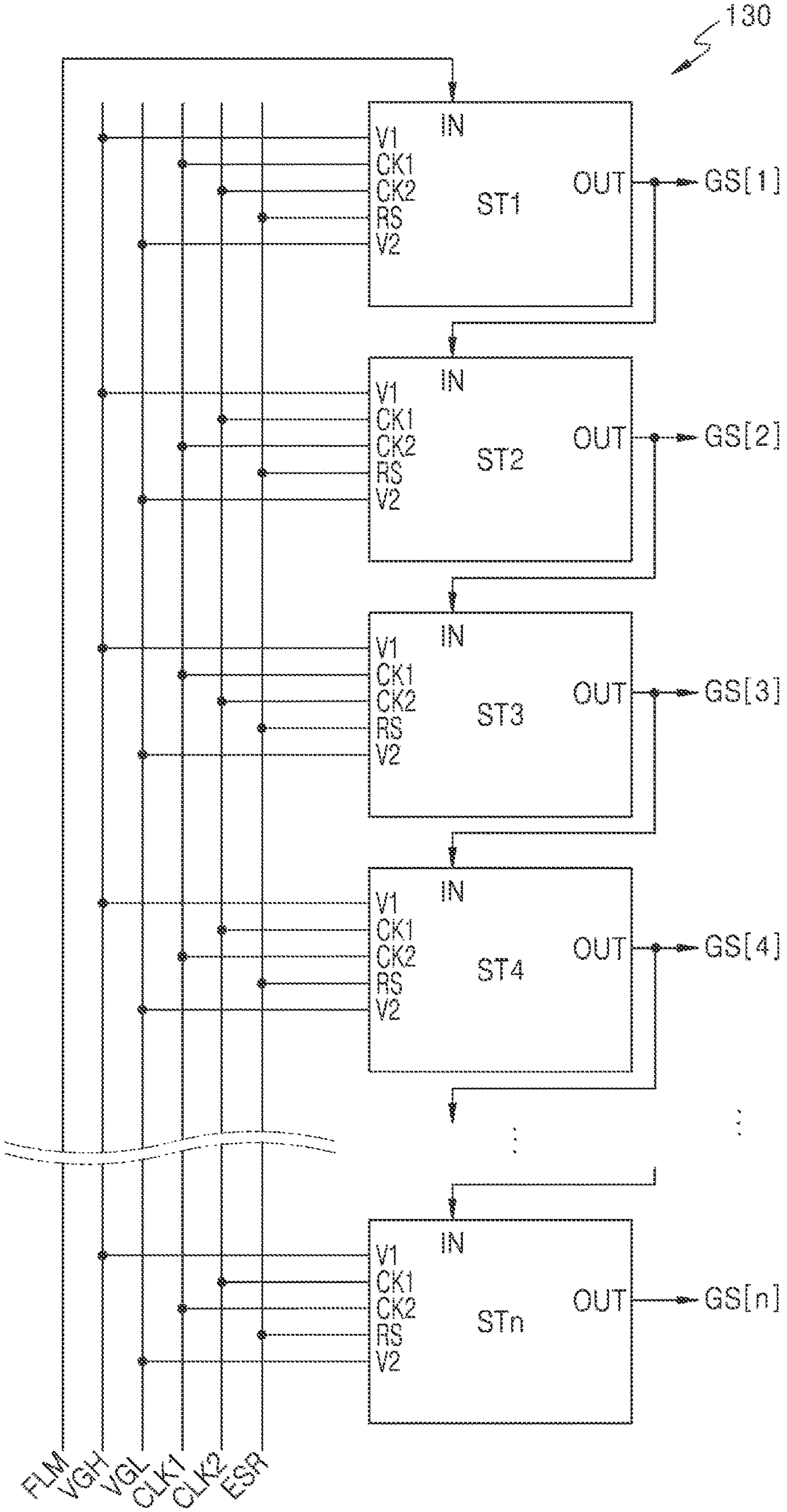
FIG. 11 is a schematic view of a gate driving circuit according to one or more embodiments.
Figure 12:
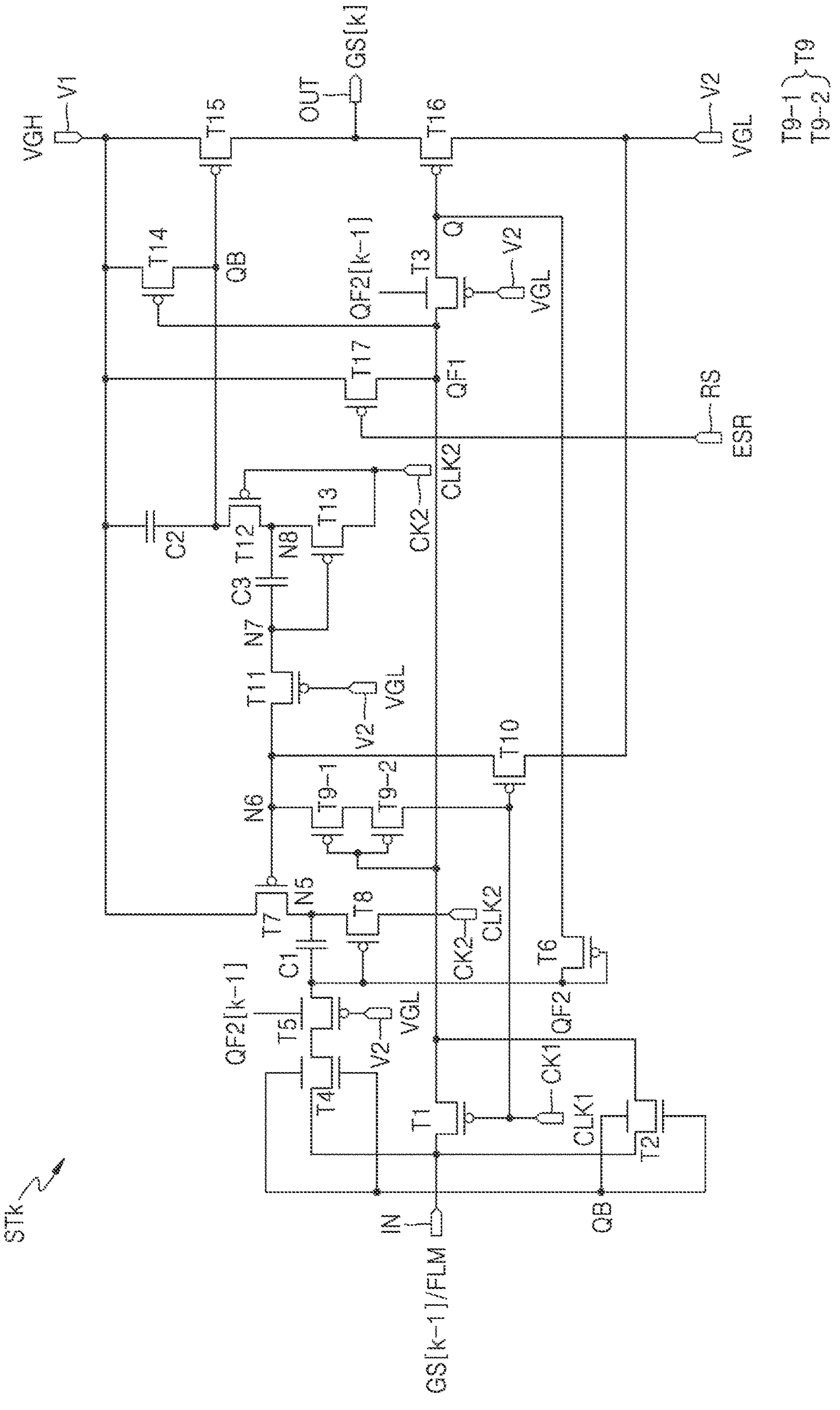
FIGS. 12 to 14 are circuit diagrams of an example of a stage included in the gate driving circuit of FIG. 11.
Figure 13:
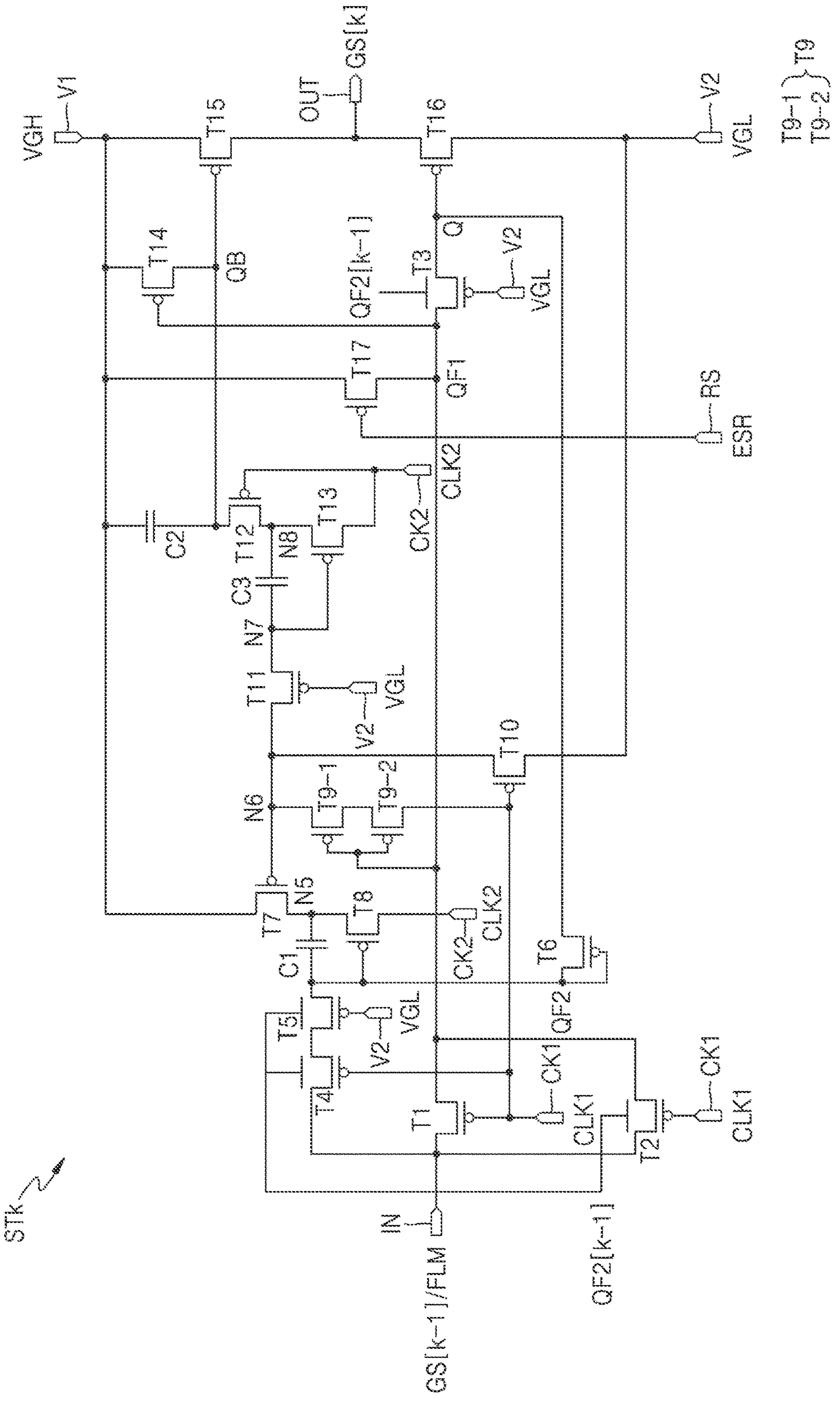
Figure 14:
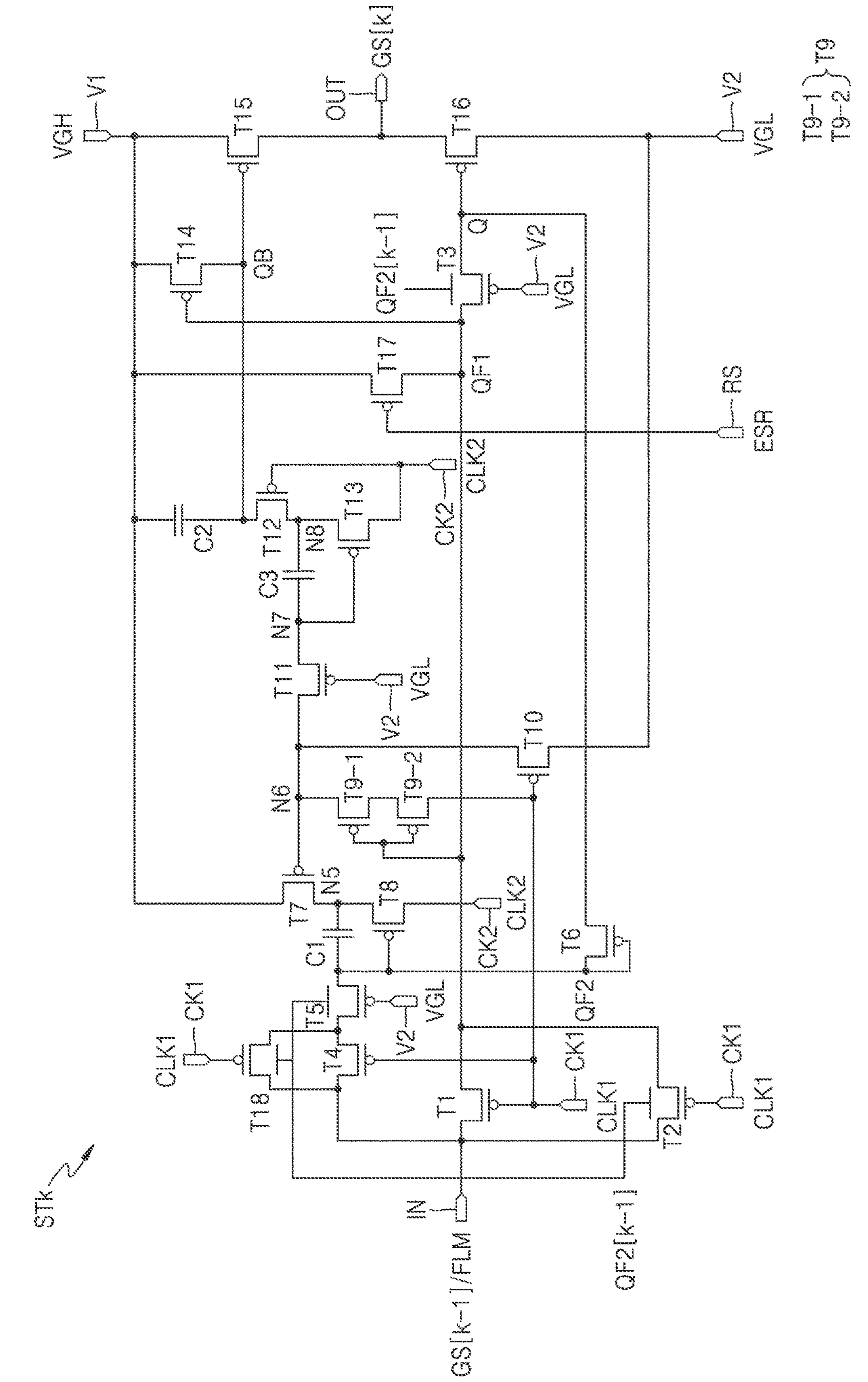

FIG. 11 is a schematic view of the gate driving circuit according to one or more embodiments. FIGS. 12 to 14 are circuit diagrams of an example of a stage included in the gate driving circuit of FIG. 11.

Referring to FIG. 11, the gate driving circuit 130 may include a plurality of stages ST1 to STn, and the plurality of stages ST1 to STn may be configured to sequentially output gate signals GS[1] to GS[n] to the gate lines. Each of the plurality of stages ST1 to STn may include an input terminal IN, a first voltage input terminal V1, a second voltage input terminal V2, a first clock terminal CK1, a second clock terminal CK2, a reset terminal RS, and an output terminal OUT. Each of the plurality of stages ST1 to STn shown in FIG. 11 is different from the plurality of stages ST1 to STn shown in FIG. 2 in that the third voltage input terminal V3, to which the third voltage VGL2 is input, is omitted, and other constructions are the same.

In FIGS. 12 to 14, same reference numerals are used for same elements as those described with reference to FIG. 3, and repeated descriptions thereof are omitted.

The stage shown in each of FIGS. 12 to 14 may have a construction substantially equal or similar to a construction of the stage of FIG. 8 except for the constructions of the second to fifth transistors T2 to T5. The stage shown in FIGS. 12 to 14 may be driven with the timing shown in FIG. 9.

In the stage STK shown in FIG. 12, the second transistor T2 and the fourth transistor T4 may each be N-type dual-gate oxide transistors including a pair of a first gate and a second gate, and the third transistor T3 and the fifth transistor T5 may each be P-type dual-gate silicon transistors including a pair of a first gate and a second gate.

A pair of the first gate and the second gate of the second transistor T2 and the fourth transistor T4 may be connected to the second node QB. Because the second transistor T2 and the fourth transistor T4 are implemented as N-type oxide transistors, the second transistor T2 and the fourth transistor T4 may be configured to transfer a start signal input in a low level without a voltage loss.

The first gates of the third transistor T3 and the fifth transistor T5 may be connected to the second voltage input terminal V2, and the second gates thereof may be connected to the fourth node QF2[k−1] of the (k−1)-th stage, which is a previous stage. The third transistor T3 and the fifth transistor T5 may be turned on by the second voltage VGL input to the second voltage input terminal V2. Because the third transistor T3 and the fifth transistor T5 are implemented as P-type silicon transistors having four terminals, the threshold voltages of the third transistor T3 and the fifth transistor T5 may be adjusted by adjusting a bias voltage input to the second gate. Accordingly, even when the third transistor T3 and the fifth transistor T5 are turned on by the second voltage VGL, not the third voltage VGL2, a signal input in a low level may be transferred without a voltage loss. For a bias voltage input to the second gates of the third transistor T3 and the fifth transistor T5, a node voltage inside the gate driving circuit 130 may be used. The stage STK shown in FIG. 12 shows an example in which a bias voltage input to the second gates of the third transistor T3 and the fifth transistor T5 is a voltage of the fourth node QF2[k−1] of a previous stage.

In the stage STK shown in FIG. 13, the second to fifth transistors T2 to T5 each are P-type dual-gate silicon transistors including a pair of a first gate and a second gate.

The first gates of the second transistor T2 and the fourth transistor T4 may be connected to the first clock terminal CK1, and the second gates thereof may be connected to the fourth node QF2[k−1] of the (k−1)-th stage, which is a previous stage. The second transistor T2 and the fourth transistor T4 may be turned on or turned off depending on a voltage level of a clock signal input to the first clock terminal CK1.

The first gates of the third transistor T3 and the fifth transistor T5 may be connected to the second voltage input terminal V2, and the second gates thereof may be connected to the fourth node QF2[k−1] of the (k−1)-th stage, which is a previous stage. The third transistor T3 and the fifth transistor T5 may be turned on by the second voltage VGL input to the second voltage input terminal V2.

Because the second to fifth transistors T2 to T5 are implemented as P-type silicon transistors having four terminals, the threshold voltages of the second to fifth transistors T2 to T5 may be adjusted by adjusting a bias voltage input to the second gate. Accordingly, the second to fifth transistors T2 to T5 may be configured to transfer a signal input in a low level without a voltage loss. For a bias voltage input to the second gates of the second to fifth transistors T2 to T5, a node voltage inside the gate driving circuit 130 may be used. The stage STK shown in FIG. 13 shows an example in which a bias voltage input to the second gates of the second to fifth transistors T2 to T5 is a voltage of the fourth node QF2[k−1] of a previous stage.

In the stage STK shown in FIG. 14, the second transistor T2, the third transistor T3, and the fifth transistor T5 each are P-type dual-gate silicon transistors including a pair of a first gate and a second gate, and the fourth transistor T4 is a P-type silicon transistor including one gate. In addition, the stage STK shown in FIG. 14 may further include an eighteenth transistor T18 parallel-connected to the fourth transistor T4.

The first gate of the second transistor T2 may be connected to the first clock terminal CK1, and the second gate thereof may be connected to the fourth node QF2[k−1] of the (k−1)-th stage, which is a previous stage.

The first gates of the third transistor T3 and the fifth transistor T5 may be connected to the second voltage input terminal V2, and the second gates thereof may be connected to the fourth node QF2[k−1] of the (k−1)-th stage, which is a previous stage.

A gate of the fourth transistor T4 may be connected to the first clock terminal CK1.

The first gate of the eighteenth transistor T18 may be connected to the first clock terminal CK1, and the second gate thereof may be connected to the fourth node QF2[k−1] of the (k−1)-th stage, which is a previous stage.

Although the second to fifth transistors T2 to T5 are implemented as P-type silicon transistors, because a bias voltage input to the second gate is adjusted or a transistor of a four-terminal structure in which a threshold voltage is adjusted is parallel connected to the P-type silicon transistor, a signal input in a low level may be transferred without a relevant voltage loss. For a bias voltage input to the second gates of the second transistor T2, the third transistor T3, the fifth transistor T5, and the eighteenth transistor T18, a node voltage inside the gate driving circuit 130 may be used. The stage STK shown in FIG. 14 shows an example in which a bias voltage input to the second gates of the second transistor T2, the third transistor T3, the fifth transistor T5, and the eighteenth transistor T18 is a voltage of the fourth node QF2[k−1] of a previous stage.

In the embodiments, while charging a node connected to a gate of a pull-down transistor (e.g., the sixteenth transistor T16) included in the output unit of the driving circuit, a voltage loss of a signal of a low level transferred by transistors on a charging path may be reduced. As an example, in each stage, a compensation transistor (an N-type oxide transistor or a P-type silicon transistor having four terminals) may be parallel-connected to the first transistor T1. In addition, in each stage, a voltage level input to the gates of the third transistor T3 and the fifth transistor T5 may be changed, or the third transistor T3 and the fifth transistor T5 may be implemented as a P-type silicon transistor having four terminals. In addition, the fourth transistor T4 may be implemented as an N-type oxide transistor or a P-type silicon transistor having four terminals, or a P-type silicon transistor having four terminals may be parallel-connected to the fourth transistor T4 as a compensation transistor.

The display apparatus according to embodiments may be implemented as electronic apparatuses, such as smartphones, mobile phones, smartwatches, navigation apparatuses, game consoles, televisions (TVs), head units for automobiles, notebook computers, laptop computers, tablet computers, personal multimedia players (PMPs), personal digital assistants (PDAs), and the like. In addition, an electronic apparatus may be a flexible apparatus.

According to one or more embodiments, a gate driving circuit configured to stably output gate signals and a display apparatus including the gate driving circuit may be provided. Aspects of the disclosure are not limited to the above aspects but may variously extend without departing from the scope of the disclosure.

It should be understood that embodiments described herein should be considered in a descriptive sense only and not for purposes of limitation. Descriptions of aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, with functional equivalents thereof to be included therein.

What is claimed is:

1. A gate driving circuit comprising stages, the stages comprising:

an output unit comprising a pull-up transistor and a pull-down transistor, the pull-up transistor being connected between a first voltage input terminal to which a first voltage is input and an output terminal, and the pull-down transistor being connected between the output terminal and a second voltage input terminal to which a second voltage is input;

a first node controller configured to control a voltage level of a first node connected to a gate of the pull-down transistor, and comprising:

a first transistor connected between the first node and an input terminal to which a start signal is input; and a second transistor connected in parallel to the first transistor, and configured to compensate for a voltage loss of the start signal due to a threshold voltage of the first transistor when the first transistor transfers the start signal to the first node; and a second node controller configured to control a voltage of a second node connected to a gate of the pull-up transistor.

2. The gate driving circuit of claim 1, wherein the first transistor comprises a P-type transistor comprising a silicon semiconductor, and the second transistor comprises an N-type transistor comprising an oxide semiconductor.

3. The gate driving circuit of claim 2, wherein the first transistor comprises a gate connected to a clock terminal, and the second transistor comprises a gate connected to the second node.

4. The gate driving circuit of claim 2, wherein the first transistor comprises a gate connected to a clock terminal, and the second transistor comprises a first gate and a second gate connected to the second node.

5. The gate driving circuit of claim 1, wherein the first transistor and the second transistor comprise P-type transistors comprising a silicon semiconductor.

6. The gate driving circuit of claim 5, wherein the first transistor comprises a gate connected to a clock terminal, and wherein the second transistor comprises a first gate connected to the clock terminal, and a second gate connected to a node of a previous stage.

7. The gate driving circuit of claim 1, wherein the first node controller further comprises a third transistor connected between the first transistor and the first node and comprising a gate connected to a third voltage input terminal to which a third voltage is input, wherein a voltage level of the second voltage is less than a voltage level of the first voltage, and wherein a voltage level of the third voltage is less than the voltage level of the second voltage.

8. The gate driving circuit of claim 1, wherein the first node controller further comprises a third transistor connected between the first transistor and the first node and comprising a first gate connected to the second voltage input terminal, and a second gate connected to a node of a previous stage, and wherein a voltage level of the second voltage is less than a voltage level of the first voltage.

9. The gate driving circuit of claim 1, wherein the first node controller further comprises:

a fourth transistor connected between the input terminal and a fourth node;

a fifth transistor connected between the fourth transistor and the fourth node;

a diode-connected sixth transistor between the fourth node and the first node; and a capacitor connected to the fourth node.

10. The gate driving circuit of claim 9, wherein the fourth transistor comprises a gate connected to the second node, wherein the fifth transistor comprises a gate connected to a third voltage input terminal to which a third voltage is input, wherein the fourth transistor comprises an N-type transistor comprising an oxide semiconductor, wherein the fifth transistor comprises a P-type transistor comprising a silicon semiconductor, wherein a voltage level of the second voltage is less than a voltage level of the first voltage, and wherein a voltage level of the third voltage is less than the voltage level of the second voltage.

11. The gate driving circuit of claim 9, wherein the fourth transistor comprises a first gate and a second gate connected to the second node, wherein the fifth transistor comprises a gate connected to a third voltage input terminal to which a third voltage is input, wherein the fourth transistor comprises an N-type transistor comprising an oxide semiconductor, wherein the fifth transistor comprises a P-type transistor comprising a silicon semiconductor, wherein a voltage level of the second voltage is less than a voltage level of the first voltage, and wherein a voltage level of the third voltage is less than the voltage level of the second voltage.

12. The gate driving circuit of claim 9, wherein the fourth transistor comprises a first gate connected to a clock terminal, and a second gate connected to a fourth node of a previous stage, wherein the fifth transistor comprises a gate connected to a third voltage input terminal to which a third voltage is input, wherein the fourth transistor and the fifth transistor comprise P-type transistors comprising a silicon semiconductor, wherein a voltage level of the second voltage is less than a voltage level of the first voltage, and wherein a voltage level of the third voltage is less than the voltage level of the second voltage.

13. The gate driving circuit of claim 9, wherein the fourth transistor comprises a first gate connected to a clock terminal, and a second gate connected to a fourth node of a previous stage, wherein the fifth transistor comprises a first gate connected to the second voltage input terminal, and a second gate connected to the fourth node of the previous stage, wherein the fourth transistor and the fifth transistor comprise P-type transistors comprising a silicon semiconductor, and wherein a voltage level of the second voltage is less than a voltage level of the first voltage.

14. The gate driving circuit of claim 9, wherein the first node controller further comprises an eighteenth transistor connected in parallel to the fourth transistor, wherein the fourth transistor comprises a gate connected to a clock terminal, wherein the fifth transistor comprises a first gate connected to the second voltage input terminal, and a second gate connected to a fourth node of a previous stage, wherein the eighteenth transistor comprises a first gate connected to the clock terminal, and a second gate connected to the fourth node of the previous stage, wherein the fourth transistor, the fifth transistor, and the eighteenth transistor comprise P-type transistors comprising a silicon semiconductor, and wherein a voltage level of the second voltage is less than a voltage level of the first voltage.

15. A gate driving circuit comprising stages, the stages comprising:

an output unit comprising a pull-up transistor and a pull-down transistor, the pull-up transistor being connected between a first voltage input terminal to which a first voltage is input and an output terminal, and the pull-down transistor being connected between the output terminal and a second voltage input terminal to which a second voltage is input;

a first node controller configured to control a voltage level of a first node connected to a gate of the pull-down transistor, and comprising:

a first circuit connected between an input terminal to which a start signal is input and the first node, and configured to transfer the start signal to the first node; and a second circuit connected between the input terminal and the first node, configured to boost a voltage level of a voltage of the first node, and comprising a fourth transistor connected between the input terminal and a third node, a capacitor connected to the third node, and a sixth transistor connected between the third node and the first node; and a second node controller configured to control a voltage of a second node connected to a gate of the pull-up transistor.

16. The gate driving circuit of claim 15, further comprising a fifth transistor connected between the fourth transistor and the third node, wherein the fourth transistor comprises a gate connected to the second node, wherein the fifth transistor comprises a gate connected to a third voltage input terminal to which a third voltage is input, wherein the fourth transistor comprises an N-type transistor comprising an oxide semiconductor, wherein the fifth transistor comprises a P-type transistor comprising a silicon semiconductor, wherein a voltage level of the second voltage is less than a voltage level of the first voltage, and wherein a voltage level of the third voltage is less than the voltage level of the second voltage.

17. The gate driving circuit of claim 15, further comprising a fifth transistor connected between the fourth transistor and the third node, wherein the fourth transistor comprises a first gate and a second gate connected to the second node, wherein the fifth transistor comprises a gate connected to a third voltage input terminal to which a third voltage is input, wherein the fourth transistor comprises an N-type transistor comprising an oxide semiconductor, wherein the fifth transistor comprises a P-type transistor comprising a silicon semiconductor, wherein a voltage level of the second voltage is less than a voltage level of the first voltage, and wherein a voltage level of the third voltage is less than the voltage level of the second voltage.

18. The gate driving circuit of claim 15, further comprising a fifth transistor connected between the fourth transistor and the third node, wherein the fourth transistor comprises a first gate connected to a clock terminal, and a second gate connected to a third node of a previous stage, wherein the fifth transistor comprises a gate connected to a third voltage input terminal to which a third voltage is input, wherein the fourth transistor and the fifth transistor comprise P-type transistors comprising a silicon semiconductor, wherein a voltage level of the second voltage is less than a voltage level of the first voltage, and wherein a voltage level of the third voltage is less than the voltage level of the second voltage.

19. The gate driving circuit of claim 15, further comprising a fifth transistor connected between the fourth transistor and the third node, wherein the fourth transistor comprises a first gate connected to a clock terminal, and a second gate connected to a third node of a previous stage, wherein the fifth transistor comprises a first gate connected to the second voltage input terminal, and a second gate connected to the third node of the previous stage, wherein the fourth transistor and the fifth transistor comprise P-type transistors comprising a silicon semiconductor, and wherein a voltage level of the second voltage is less than a voltage level of the first voltage.

20. The gate driving circuit of claim 15, further comprising a fifth transistor connected between the fourth transistor and the third node, wherein the second circuit further comprises an eighteenth transistor connected in parallel to the fourth transistor, wherein the fourth transistor comprises a gate connected to a clock terminal, wherein the fifth transistor comprises a first gate connected to the second voltage input terminal, and a second gate connected to a third node of a previous stage, wherein the eighteenth transistor comprises a first gate connected to the clock terminal, and a second gate connected to the third node of the previous stage, wherein the fourth transistor, the fifth transistor, and the eighteenth transistor comprise P-type transistors comprising a silicon semiconductor, and wherein a voltage level of the second voltage is less than a voltage level of the first voltage.

* * * * *